United States Patent
Komura et al.

(10) Patent No.: US 6,689,496 B1
(45) Date of Patent: Feb. 10, 2004

(54) MAGNETIC RECORDING MEDIUM, METHOD OF PRODUCING MAGNETIC RECORDING MEDIUM, AND MAGNETIC STORAGE APPARATUS

(75) Inventors: Haruhiro Komura, Minato (JP); Yuki Yoshida, Kawasaki (JP); Hisashi Umeda, Higashine (JP); Iwao Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 126 days.

(21) Appl. No.: 09/716,386

(22) Filed: Nov. 20, 2000

(30) Foreign Application Priority Data

Apr. 7, 2000 (JP) .......................... 2000-107078

(51) Int. Cl.[7] .............................. G11B 5/66; G11B 5/70; B05D 5/12
(52) U.S. Cl. ................... 428/694 TS; 428/212; 428/336; 428/611; 428/667; 428/678; 428/694 TM; 428/900; 427/128; 427/130; 427/131
(58) Field of Search ................... 428/694 TS, 336, 428/212, 900, 694 TM, 611, 667, 678; 427/128, 130, 131

(56) References Cited

U.S. PATENT DOCUMENTS 5,693,426 A 12/1997 Lee et al. .................. 428/611
5,759,681 A * 6/1998 Hosoe et al. ................ 428/332
6,117,570 A * 9/2000 Chen et al. ............... 428/694 T
6,309,765 B1 * 10/2001 Suekane et al. ....... 428/694 TS
6,346,339 B1 * 2/2002 Harkness, IV et al. 428/694 TS
6,348,276 B1 * 2/2002 Chen et al. ............ 428/694 TS
6,403,241 B1 * 6/2002 Chen et al. ............ 428/694 TS

FOREIGN PATENT DOCUMENTS

| JP | 10112017 A | 4/1998 |
| JP | 10302242 A | 11/1998 |
| JP | 10334444 A | 12/1998 |
| JP | 11039635 A | 2/1999 |
| JP | 11073621 A | 3/1999 |
| JP | 11110733 A | 4/1999 |
| JP | 11126322 A | 5/1999 |
| JP | 11144220 A | 5/1999 |
| JP | 11195530 A | 7/1999 |
| JP | 11219511 A | 8/1999 |
| JP | 11-238222 | 8/1999 |
| JP | 11242810 A | 9/1999 |
| JP | 11259846 A | 9/1999 |
| JP | 11283233 A | 10/1999 |
| JP | 11306532 A | 11/1999 |

* cited by examiner

*Primary Examiner*—Holly Rickman
(74) *Attorney, Agent, or Firm*—Greer, Burns & Crain, Ltd.

(57) ABSTRACT

A magnetic recording medium includes a substrate, a nonmagnetic seed layer provided on the substrate, and a magnetic layer provided on the nonmagnetic seed layer via one or a plurality of layers. The nonmagnetic seed layer is made of NiAl having an oxygen concentration of approximately 1500 to 4000 ppm.

20 Claims, 32 Drawing Sheets

FIG. 8

| LAYER THICKNESS [nm] | | | S* | O/W dB | S/Nt dB | Nt μVrms | Nm /Sf8 | Siso/Nm dB |
| NiAl 2600ppm | NiAl 910ppm | NiAl 910ppm | | | | | | |
|---|---|---|---|---|---|---|---|---|
| 15 | – | – | 0.73 | −31.8 | 9.3 | 17.7 | 0.0212 | 24.5 |
| – | 15 | 15 | 0.67 | −30.7 | 9.0 | 18.1 | 0.0225 | 23.9 |

FIG.10

| SAMPLE NO. | HEATING BEFORE SEPARATION | THICKNESS OF 1ST NiAl LAYER (nm) | THICKNESS OF SEPARATION LAYER (nm) | THICKNESS OF 2ND NiAl LAYER (nm) | Hc (Oe) | Nm/Sf8 | $S_{LF}/Nm$ dB | S/Nt dB |
|---|---|---|---|---|---|---|---|---|
| 1 | NONE | 45 | 3 | 15 | 3319 | 0.0158 | 27.0 | 11.9 |
| 2 | NONE | 15 | 3 | 45 | 3257 | 0.0156 | 27.1 | 11.6 |
| 3 | 800W-5s | 45 | 3 | 15 | 3407 | 0.0169 | 26.4 | 11.4 |
| 4 | 800W-5s | 15 | 3 | 45 | 3517 | 0.0166 | 26.6 | 11.7 |
| 5 | NONE | 45 | NONE | 15 | 3270 | 0.0167 | 26.5 | 11.2 |
| 6 | NONE | 15 | NONE | 45 | 3079 | 0.0163 | 26.7 | 11.4 |
| 7 | 800W-5s | 45 | NONE | 15 | 3398 | 0.0186 | 25.6 | 10.8 |
| 8 | 800W-5s | 15 | NONE | 45 | 3359 | 0.0188 | 25.5 | 10.8 |

AVERAGE GRAIN DIAMETER=9.5nm

AVERAGE GRAIN DIAMETER=13.1nm

FIG.22

| UNDERLAYER (2-LAYER) | CrMo15 (UPPER) CrMo6 (LOWER) | IN-PLANE COERCIVITY |
|---|---|---|
| | | 3500 |
| UNDERLAYER (1-LAYER) | CrMo6 | 3360 |
| | CrMo15 | 3250 |

FIG.30

| ANNEALING TEMPERATURE | IN-PLANE COERCIVITY | S | S* |
|---|---|---|---|
| 190°C | 3770 | 0.71 | 0.80 |
| 210°C | 3400 | 0.79 | 0.85 |
| 230°C | 3290 | 0.70 | 0.87 |
| NO ANNEALING | 3625 | 0.66 | 0.73 |

MAGNETIC RECORDING MEDIUM, METHOD OF PRODUCING MAGNETIC RECORDING MEDIUM, AND MAGNETIC STORAGE APPARATUS

BACKGROUND OF THE INVENTION

This application claims the benefit of a Japanese Patent Application No. 2000-107078 filed Apr. 7, 2000, in the Japanese Patent Office, the disclosure of which is hereby incorporated by reference.

1. Field of the Invention

The present invention generally relates to magnetic recording media, methods of producing magnetic recording media and magnetic storage apparatuses, and more particularly to a magnetic recording medium which is suited for high-density recording, a method of producing such a magnetic recording medium, and a magnetic storage apparatus provided with such a magnetic recording medium.

2. Description of the Related Art

The recording density of longitudinal magnetic recording media such as magnetic disks has increased considerably due to the reduction of media noise and the development of magnetoresistive heads and spin valve heads. A typical magnetic recording medium has a stacked structure comprising a substrate, an underlayer, a magnetic layer and a protection layer which are stacked in this order. The underlayer is made of Cr or a Cr-based alloy, and the magnetic layer is made of a Co-based alloy.

A method of reducing the media noise is proposed in a U.S. Pat. No. 5,693,426, for example. According to this proposed method, an underlayer made of NiAl is used to control the crystal structure of the magnetic layer, so as to reduce the media noise and to improve the recording and reproducing characteristics such as the resolving power.

However, in order to cope with the recent demands to realize an even higher recording density, it has become necessary to further improve various characteristics of the magnetic recording medium. More particularly, it is necessary to further reduce the crystal grain size of the various layers including the magnetic layer, to accurately control the crystal grain size, and to improve the crystal orientation of the various layers.

In the conventional magnetic recording media, there is a problem in that it is difficult to further improve the coercivity and squareness ratio and to reduce media noise.

SUMMARY OF THE INVENTION

Accordingly, it is a general object of the present invention to provide a novel and useful magnetic recording medium, a method of producing the magnetic recording medium, and a magnetic storage apparatus, in which the problem described above is eliminated.

Another and more specific object of the present invention is to provide a magnetic recording medium, a method of producing the magnetic recording medium, and a magnetic storage apparatus, which can further improve the coercivity and squareness ratio and reduce the media noise.

Still another object of the present invention is to provide a magnetic recording medium comprising a substrate, a nonmagnetic seed layer provided on the substrate, and a magnetic layer provided on the nonmagnetic seed layer via one or a plurality of layers, where the nonmagnetic seed layer is made of NiAl having an oxygen concentration of approximately 1500 to 4000 ppm. According to the magnetic recording medium of the present invention, it is possible to improve the coercivity and squareness ratio, and to reduce the media noise of the magnetic recording medium.

A further object of the present invention is to provide a method of producing a magnetic recording medium having a nonmagnetic seed layer provided on a substrate, and a magnetic layer provided on the nonmagnetic seed layer via one or a plurality of layers, comprising the step of forming the nonmagnetic seed layer by growing NiAl at a temperature in a range of approximately 200° C. to 280° C. According to the method of the present invention, it is possible to realize a magnetic recording medium having improved coercivity and squareness ratio and reduced media noise.

Other objects and further features of the present invention will be apparent from the following detailed description when read in conjunction with the accompanying drawings.

BRIEF DESCRIPTION OF THE DRAWINGS

FIG. 8 is a diagram showing investigation results of the electromagnetic conversion characteristic;

FIG. 10 is a diagram showing a media characteristic of the modification of the fifth embodiment;

FIG. 22 is a diagram showing the in-plane coercivity measured when a CrMo underlayer is made up of a single layer and when made up of two layers;

FIG. 30 is a diagram showing a static magnetic characteristic of the magnetic recording medium obtained when an annealing process is carried out after formation of the magnetic layer;

DESCRIPTION OF THE PREFERRED EMBODIMENTS

Figure 1:
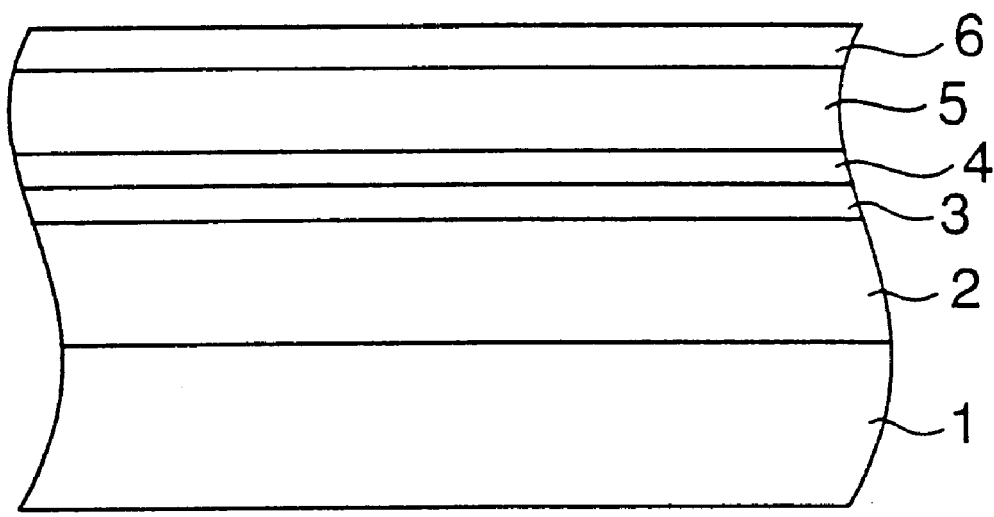
FIG. 1 is a cross sectional view showing an important part of a first embodiment of a magnetic recording medium according to the present invention.

FIG. 1 is a cross sectional view showing an important part of a first embodiment of a magnetic recording medium according to the present invention. This first embodiment of the magnetic recording medium can be produced by a first embodiment of a method of producing the magnetic recording medium according to the present invention.

As shown in FIG. 1, the magnetic recording medium generally includes a nonmagnetic substrate 1, a nonmagnetic seed layer 2, a nonmagnetic underlayer 3, a nonmagnetic intermediate layer 4, a magnetic layer 5, and a protection layer 6. In this embodiment, the substrate 1 is made of glass, and the seed layer 2 is made of NiAl. The underlayer 3 is made of a Cr-based alloy, and the intermediate layer 4 is made of a CoCr-based alloy. The magnetic layer 5 is made of a Co-based alloy, and the protection layer 6 is made of C. Furthermore, in this embodiment, an oxygen concentration of the NiAl forming the seed layer 2 is set to approximately 1500 to 4000 ppm.

In the first embodiment of the producing method, after the glass substrate 1 is heated to approximately 220° C., DC sputtering is employed to successively form the NiAl seed layer 2 to a thickness of 60 nm, the $Cr_{90}Mo_{10}$ underlayer 3 to a thickness of 3 nm, the CoCr intermediate layer 4 to a thickness of 1.5 nm, the CoCrPtB magnetic layer 5, and the C protection layer 6. The gas pressure is set to 5 mTorr for the formation of the layers from the NiAl seed layer 2 up to the CoCrPtB magnetic layer 5, and the gas pressure is set to 8 mTorr for the formation of the C protection layer 6. With respect to the NiAl seed layer 2, the oxygen concentration was changed to investigate a change in electromagnetic conversion characteristic.

Figure 2:
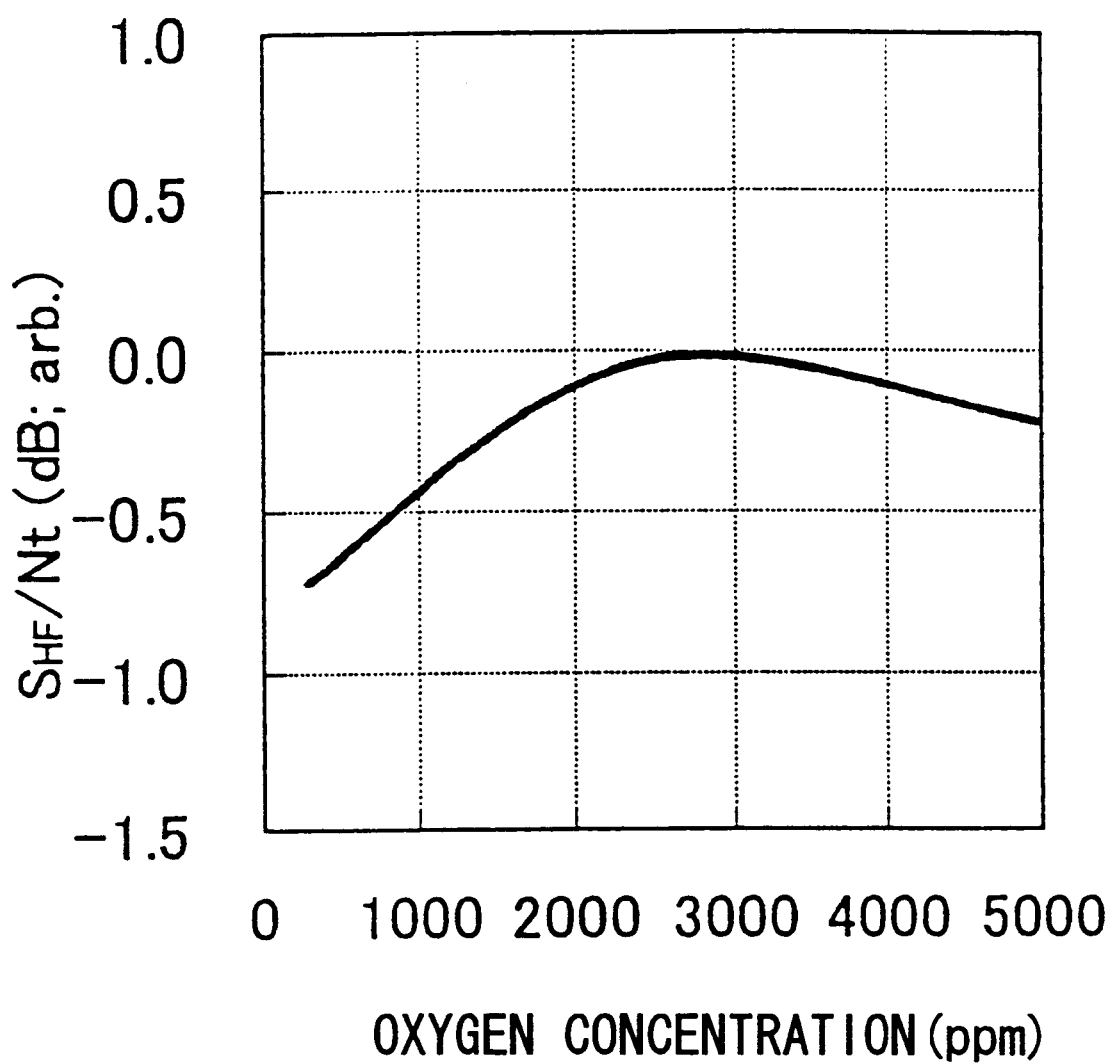
FIG. 2 is a diagram showing investigation results of the change in electromagnetic conversion characteristic with respect to the change in oxygen concentration in a seed layer.

FIG. 2 is a diagram showing investigation results of the change in electromagnetic conversion characteristic with respect to the change in oxygen concentration in the NiAl seed layer 2. In FIG. 2, the ordinate indicates the high-frequency total signal-to-noise (S/N) ratio $S_{HF}/Nt$ (dB/arbitrary units), and the abscissa indicates the amount of oxygen, that is, the oxygen content (ppm) of the NiAl forming the seed layer 2. The high-frequency total S/N ratio $S_{HF}/Nt$ was measured using a giant magnetoresistive (GMR) head. As may be seen from FIG. 2, it was confirmed that the signal-to-noise (S/N) ratio of the magnetic recording medium is satisfactory when the oxygen concentration of the NiAl forming the seed layer 2 is in a range of approximately 1500 to 4000 ppm.

Next, a description will be given of a second embodiment of the magnetic recording medium according to the present invention. The basic structure of this second embodiment of the magnetic recording medium and the third and subsequent embodiments of the magnetic recording medium is the same as that of the first embodiment of the magnetic recording medium described above, and illustration and description thereof will be omitted.

Figure 3:
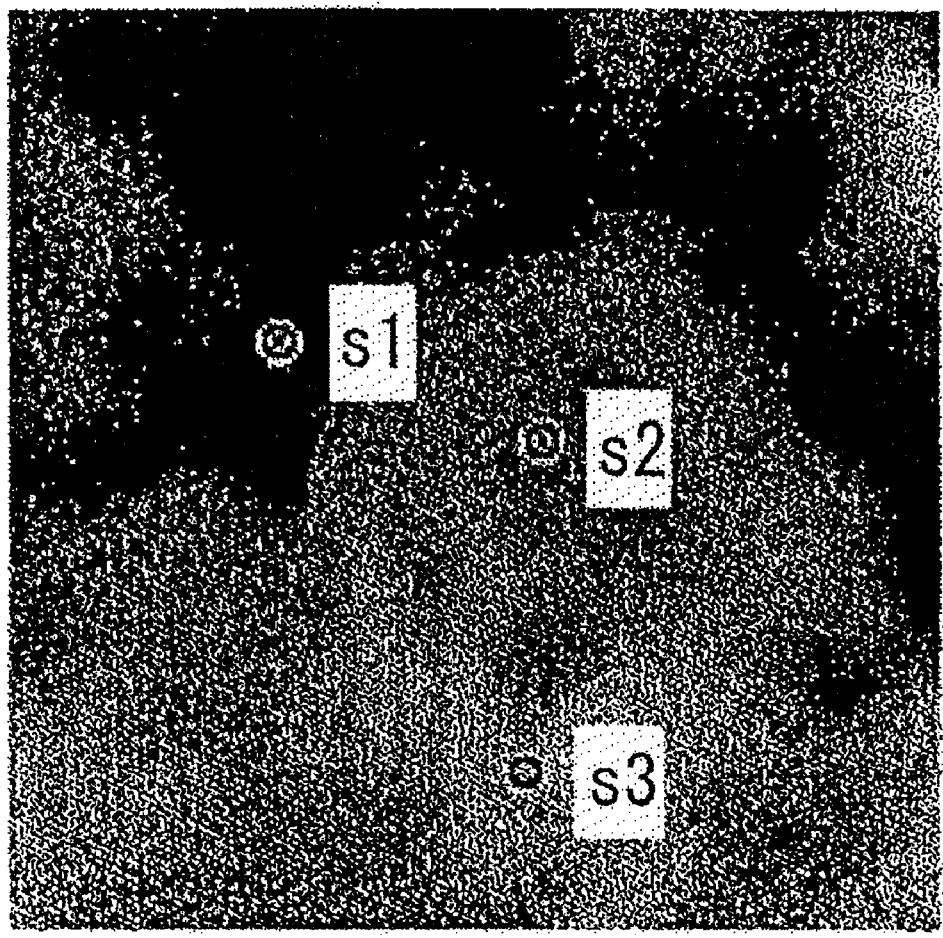
FIG. 3 is a diagram showing a STEM dark-field view of small spots in the seed layer.
Figure 4:
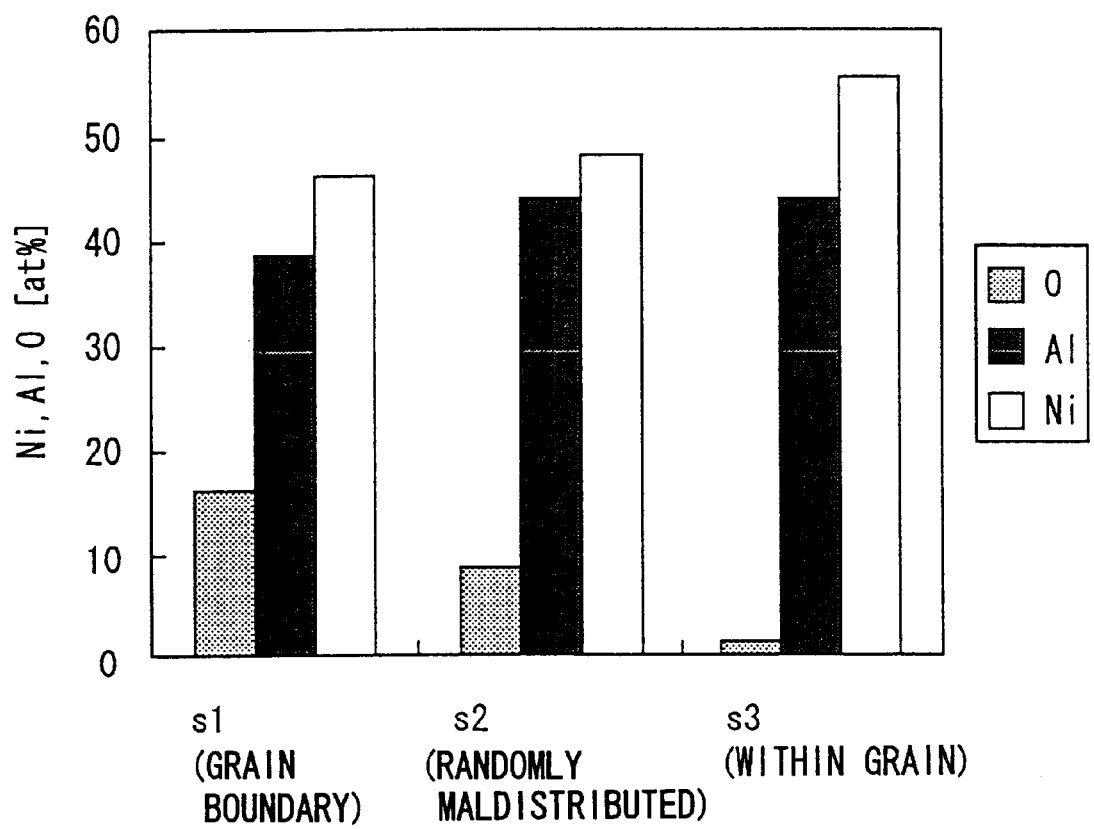
FIG. 4 is a diagram showing EDS analysis results of the small spots in the seed layer.

In this second embodiment of the magnetic recording medium, the oxygen randomly exists in a maldistributed manner within the crystal grains of the NiAl forming the NiAl seed layer 2. FIG. 3 is a diagram showing a STEM dark-field view of small spots in the NiAl seed layer 2. In addition, FIG. 4 is a diagram showing EDS analysis results of the small spots in the NiAl seed layer 2. In FIG. 4, the ordinate indicates the at % of Ni, Al and O, and the abscissa indicates the small spots. In FIGS. 3 and 4, a spot s1 indicates a grain boundary location, a spot s2 indicates a location where the oxygen randomly appears maldistributed within the crystal grains of the NiAl, and a spot s3 indicates a location within the crystal grains of the NiAl.

As may be seen from FIG. 4, a large amount of the oxygen (O) exists at the spot s1, that is, the grain boundary location, and the oxygen (O) also exists at the spot s2, that is, the location where the oxygen (O) randomly appears maldistributed. Hence, it was confirmed extremely preferable from the point of view of reducing the crystal grain size and improving the crystal orientation, that the oxygen randomly exists in the maldistributed manner within the NiAl crystal grains of the NiAl seed layer 2.

Figure 5:
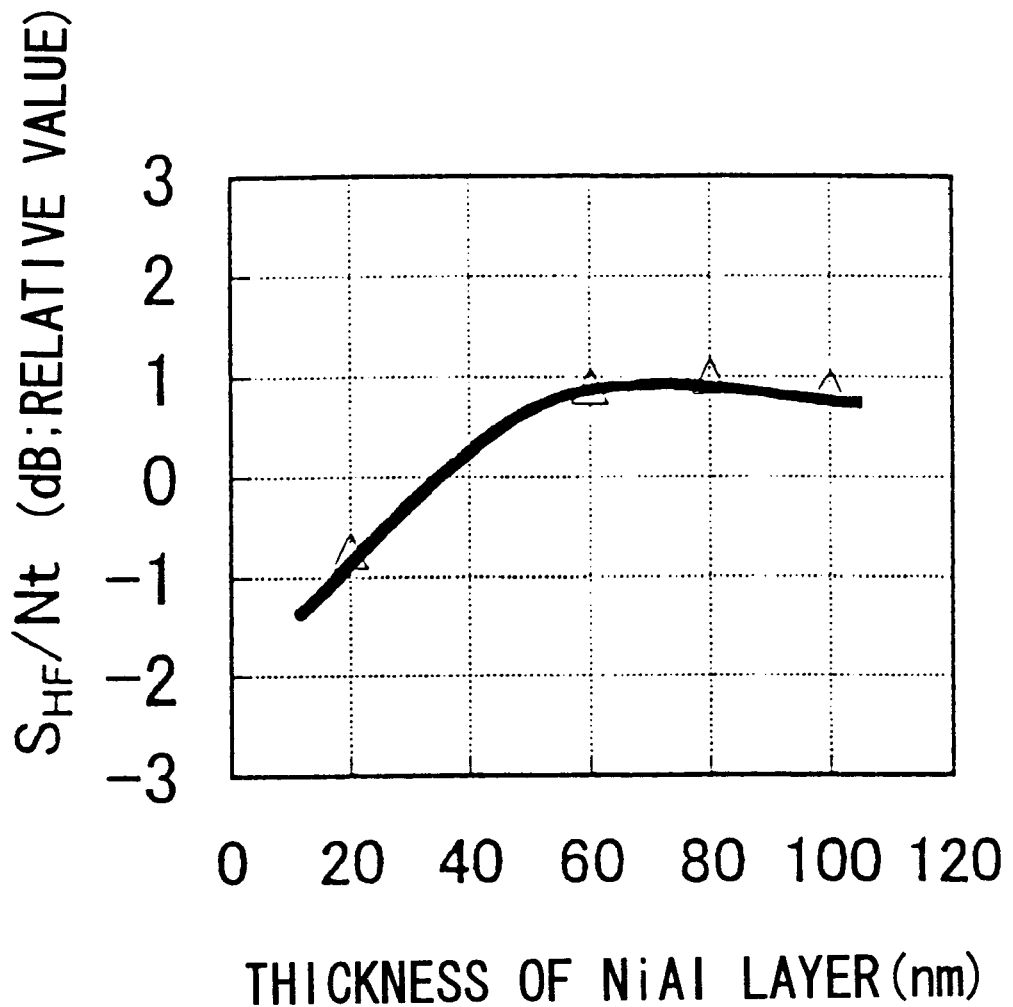
FIG. 5 is a diagram showing a seed layer thickness dependency of the electromagnetic conversion characteristic.

Next, a description will be given of a third embodiment of the magnetic recording medium according to the present invention. In this embodiment, the thickness of the NiAl seed layer 2 is set to approximately 40 to 80 nm. FIG. 5 is a diagram showing a seed layer thickness dependency of the electromagnetic conversion characteristic. In FIG. 5, the ordinate indicates the high-frequency total S/N ratio $S_{HF}/Nt$ (dB/relative value), and the abscissa indicates the thickness (nm) of the NiAl seed layer 2. The electromagnetic conversion characteristic shown in FIG. 5 was measured using a GMR head. In addition, the high-frequency total S/N ratio $S_{HF}/Nt$ is indicated by a relative value with reference to a reference medium which is produced similarly to the above except for the different composition of the CoCrPtB magnetic layer.

As the thickness of the NiAl seed layer 2 increases, there is a tendency for the (211) face crystal orientation of the NiAl to improve and the grain diameter of the NiAl to increase. This tendency promotes the crystallographic c-axis in-plane crystal orientation and increased the grain diameter, and as a result, the in-plane coercivity increases. However, as may be seen from FIG. 5, in a region where the thickness of the NiAl seed layer 2 is less than 20 nm, the grain diameter of the NiAl is small, but the (211) face crystal orientation of the NiAl is not very good. On the other hand, in a region where the thickness of the NiAl seed layer 2 is greater than 80 nm, the (211) face crystal orientation of the NiAl is good, but the grain diameter of the NiAl is large. According to the experiments conducted by the present inventors, it was confirmed that a satisfactory S/N ratio can be obtained when the thickness of the NiAl seed layer 2 is set to approximately 40 to 80 nm.

Next, a description will be given of a fourth embodiment of the magnetic recording medium according to the present invention. In this embodiment, the NiAl crystal grain diameter of the NiAl seed layer 2 is set in a range of approximately 8 to 11 nm.

Figure 6:
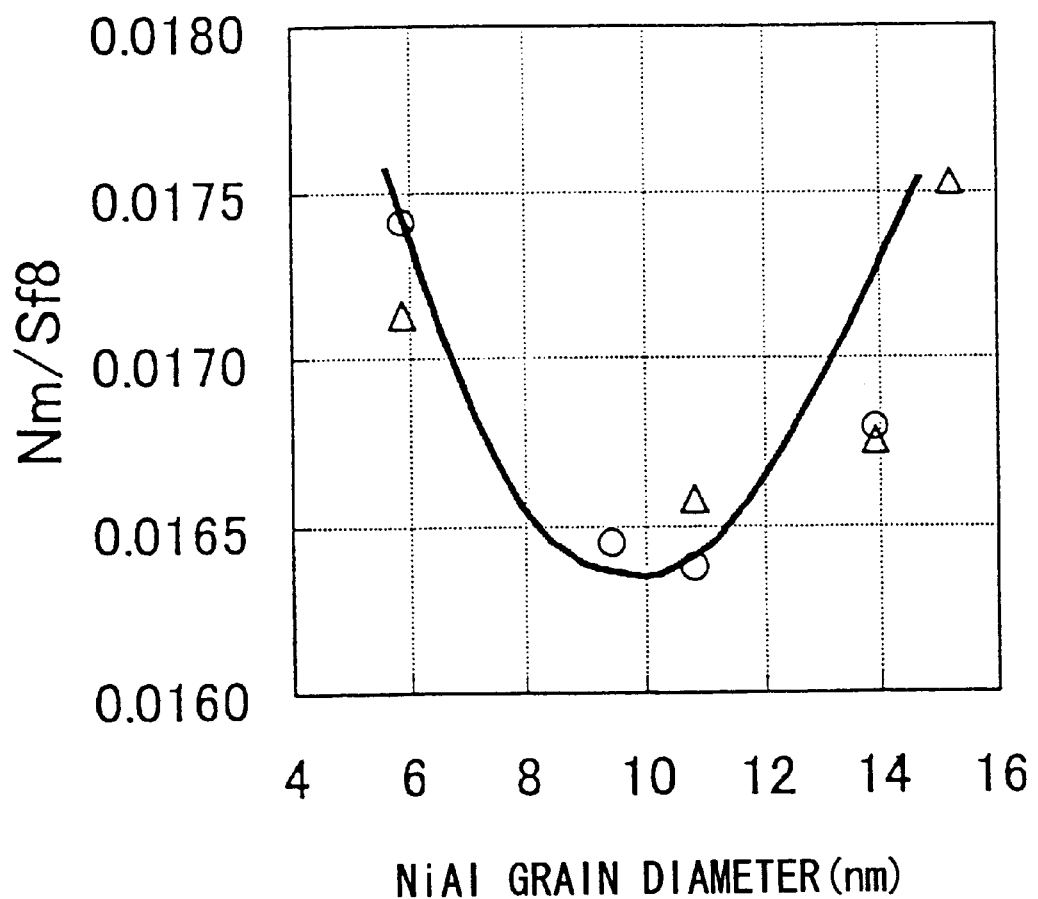
FIG. 6 is a diagram showing a dependency of media noise on NiAl crystal grain diameter.

FIG. 6 is a diagram showing a dependency of media noise on NiAl crystal grain diameter. In FIG. 6, the ordinate indicates the normalized noise Nm/Sf8, and the abscissa indicates the NiAl crystal grain diameter (nm) of the NiAl seed layer 2. As may be seen from FIG. 6, the frequency of the magnetic grain growing on a plurality grains increases when the average NiAl crystal grain diameter is less than 8 nm, and a plurality of magnetic grains are likely to grow on a single grain when the average NiAl crystal grain diameter is greater than 11 nm. Accordingly, it was confirmed that in either case, it is difficult to reduce the media noise. On the other hand, when the average NiAl crystal grain diameter is controlled to approximately 8 to 11 nm, it was confirmed that the media noise can be suppressed to a low value.

The NiAl crystal grain diameter can be controlled by controlling conditions such as the growing temperature and thickness of the NiAl seed layer 2. In addition, as will be described later, it was confirmed that the effect of reducing the media noise in this embodiment is further enhanced by making the NiAl crystal grain diameter of the NiAl seed layer 2 approximately match the grain diameter of the magnetic layer 5.

Next, a description will be given of a fifth embodiment of the magnetic recording medium according to the present invention. In this embodiment, the NiAl seed layer 2 is made up of a plurality of seed layers.

Figure 7:
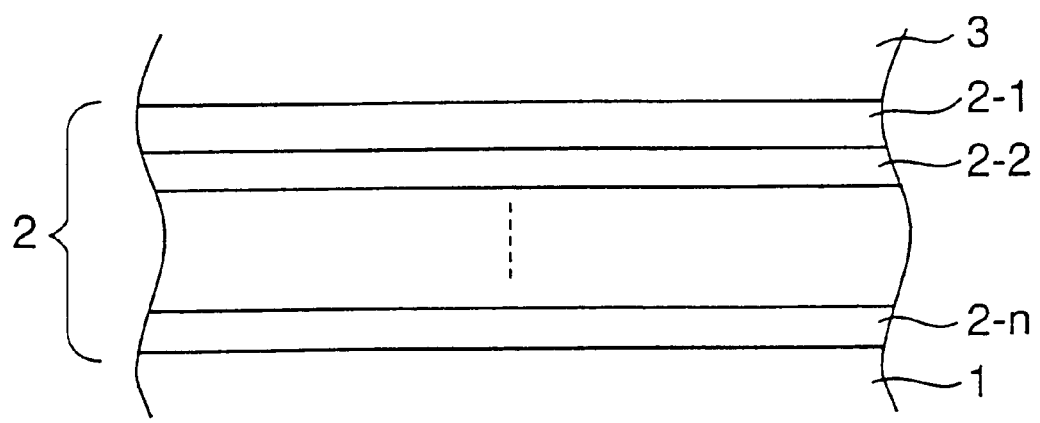
FIG. 7 is a cross sectional view showing an important part of a fifth embodiment of the magnetic recording medium according to the present invention.

FIG. 7 is a cross sectional view showing an important part of this fifth embodiment of the magnetic recording medium. In FIG. 7, those parts which are the same as those corresponding parts in FIG. 1 are designated by the same reference numerals, and a description thereof will be omitted. As shown in FIG. 7, the NiAl seed layer 2 of this embodiment is made up of n successively stacked seed layers 2-1 through 2-n, where n is an arbitrary integer greater than or equal to two. The seed layers 2-1 through 2-n preferably have mutually different properties. For example, by controlling the NiAl crystal grain diameter in each of the seed layers 2-1 through 2-n, it is possible to promote epitaxial growth of the underlayer 3 which is formed on the top seed layer 2-1.

In addition, the oxygen content may be different for the seed layers 2-1 through 2-n. For example, it is possible to reduce the media noise by making the seed layer 2-n closest to the substrate 1 have an oxygen content larger than that of the seed layer 2-1 farthest away from the substrate 1. Moreover, the oxygen contents of the seed layers 2-1 through 2-n may be mutually different such that the oxygen content gradually increases from the bottom seed layer 2-n towards the top seed layer 2-1.

Generally, it is known that the crystal grain size within a layer which is formed by sputtering can be reduced by increasing the oxygen content to a certain extent. However, in the case of epitaxial growth, the oxygen at the interface interferes with the epitaxial growth. Hence, the epitaxial growths of the underlayer 3 which is made of the Cr-based alloy and is formed on the NiAl seed layer 2, the intermediate layer 4 which is made of the CoCr-based alloy, and the magnetic layer 5 which is made of the Co-based alloy are prevented from being interfered, by controlling the NiAl crystal grain diameter using the NiAl with the high oxygen concentration at the lower layer of the NiAl seed layer 2 and using the NiAl with the low oxygen concentration at the upper layer of the NiAl seed layer 2.

The present inventors changed the oxygen content of the sputtering target which is used to stack the NiAl layers, so as to investigate the change in the electromagnetic conversion characteristic based on measurements made using a GMR head. FIG. 8 is a diagram showing investigation results of the electromagnetic conversion characteristic thus obtained. In FIG. 8, O/W indicates an overwrite characteristic, S* indicates a coercivity squareness ratio, S/Nt indicates a total S/N ratio, Nt indicates a total noise, Nm/Sf8 indicates a normalized noise, and Siso/Nm indicates an isolated wave media S/N ratio. The coercivity squareness ratio S* will be described later in conjunction with FIG. 32.

As may be seen from FIG. 8, it was confirmed that the S/N ratio becomes higher by using a target with a high oxygen concentration for the lower layer of the NiAl seed layer 2. In addition, it was also confirmed that the epitaxial growth of the underlayer 3 which is formed on the NiAl seed layer 2 is promoted by using a target with a low oxygen concentration for the upper layer of the NiAl seed layer 2. Therefore, it was confirmed that the squareness ratio of the in-plane coercivity is improved, the media noise is reduced, and the S/N ratio is improved according to this embodiment.

Figure 9:
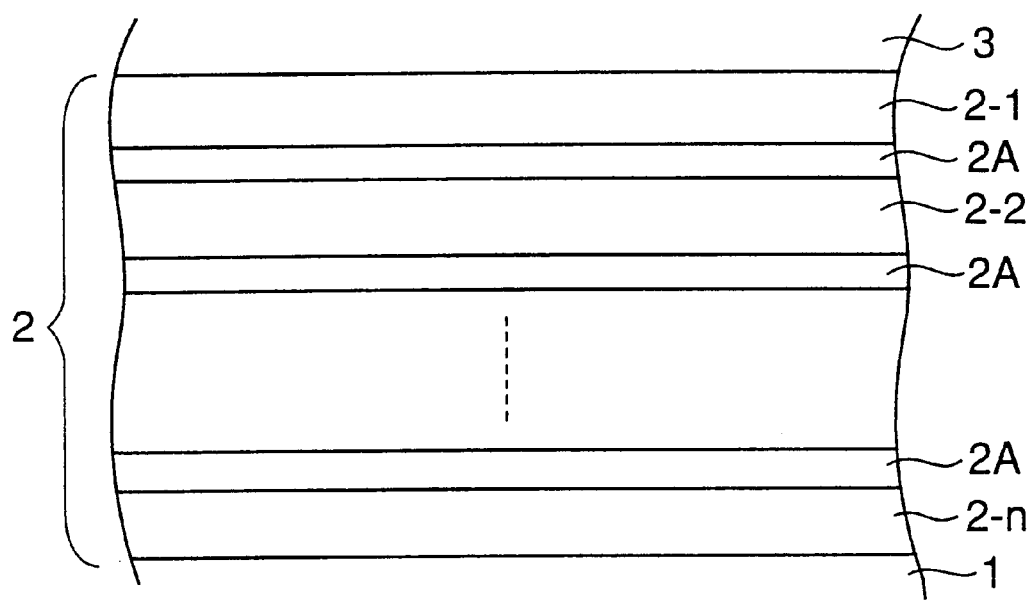
FIG. 9 is a cross sectional view showing an important part of a modification of the fifth embodiment of the magnetic recording medium.

Next, a description will be given of a modification of the fifth embodiment of the magnetic recording medium. FIG. 9 is a cross sectional view showing an important part of this modification of the fifth embodiment. In FIG. 9, those parts which are the same as those corresponding parts in FIG. 7 are designated by the same reference numerals, and a description thereof will be omitted.

As shown in FIG. 9, the NiAl seed layer 2 of this modification has a multi-layer structure made up of n successively stacked seed layers 2-1 through 2-n and a nonmagnetic layer 2A provided between each two adjacent seed layers 2-i and 2-i+1, where i is an arbitrary integer satisfying 2≦i≦n−i. In other words, each of the seed layers 2-1 through 2-n forming the NiAl seed layer 2 is separated by the nonmagnetic layer 2A. For example, each nonmagnetic layer 2A is made of $Cr_{90}Mo_{10}$ and has a thickness of 3 nm.

FIG. 10 is a diagram showing a media characteristic of this modification of the fifth embodiment when n=2 and the total thickness of the NiAl seed layer 2 is 60 nm, for cases where the ratio of the thickness of the lower first layer (seed layer 2-2) of the NiAl seed layer 2 and the thickness of the upper second layer (seed layer 2-1) of the NiAl seed layer 2 is 1:3 and 3:1. FIG. 10 also shows the media characteristic for a case where a thermal process is carried out when forming the first layer (seed layer 2-2) of the NiAl seed layer 2. In FIG. 10, Hc indicates a coercivity of the magnetic recording medium, Nm/Sf8 indicates normalized noise, $S_{LF}$/Nm indicates low-frequency media S/N ratio (also called isolated wave media S/N ratio Siso/Nm), and S/Nt indicates a total S/N ratio. As may be seen from FIG. 10, by mutually separating each of the seed layers forming the NiAl seed layer 2 by a material which epitaxially grows on one another, it was confirmed that the coercivity Hc is improved, the media noise is reduced, and the S/N ratio is improved.

Next, a description will be given of a sixth embodiment of the magnetic recording medium according to the present invention. This sixth embodiment uses crystallized glass for the substrate 1. Hence, it is possible to suppress the crystal grain diameter distribution of each layer formed on the substrate 1 to a narrow distribution, to thereby reduce the media noise.

Figure 11:
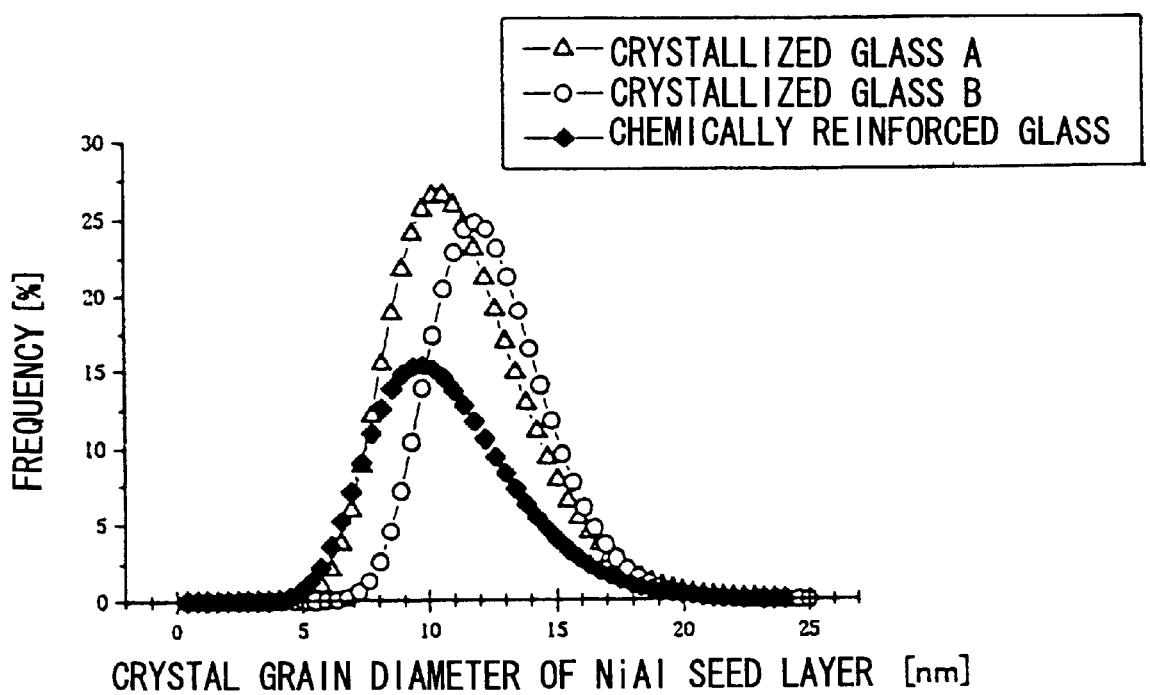
FIG. 11 is a diagram showing NiAl crystal grain diameters of the seed layer formed when using crystallized glass and when using chemically reinforced glass for a substrate.

FIG. 11 is a diagram showing NiAl crystal grain diameters of the NiAl seed layer 2 which is formed when using crystallized glass and when using chemically reinforced glass for the substrate 1. In FIG. 11, the ordinate indicates the frequency (%), and the abscissa indicates the NiAl crystal grain diameter (nm). In addition, a symbol "Δ" indicates the data of a crystallized glass A, "○" indicates the data of a crystallized glass B, and "♦" indicates the data of the chemically reinforced glass. The NiAl seed layer 2 was formed under the same conditions as the first embodiment of the producing method described above. As may be seen from FIG. 11, the NiAl crystal grain diameter distribution changes depending on the glass material used for the substrate 1, and it was confirmed that the NiAl crystal grain diameter becomes more uniform when the crystallized glass A or B is used as compared to the case where the chemically reinforced glass is used. Accordingly, it may be regarded that the effect of reducing the media noise when the crystallized glass is used for the substrate 1 is due to the low percentage of large grains in the substrate 1.

Figure 12:
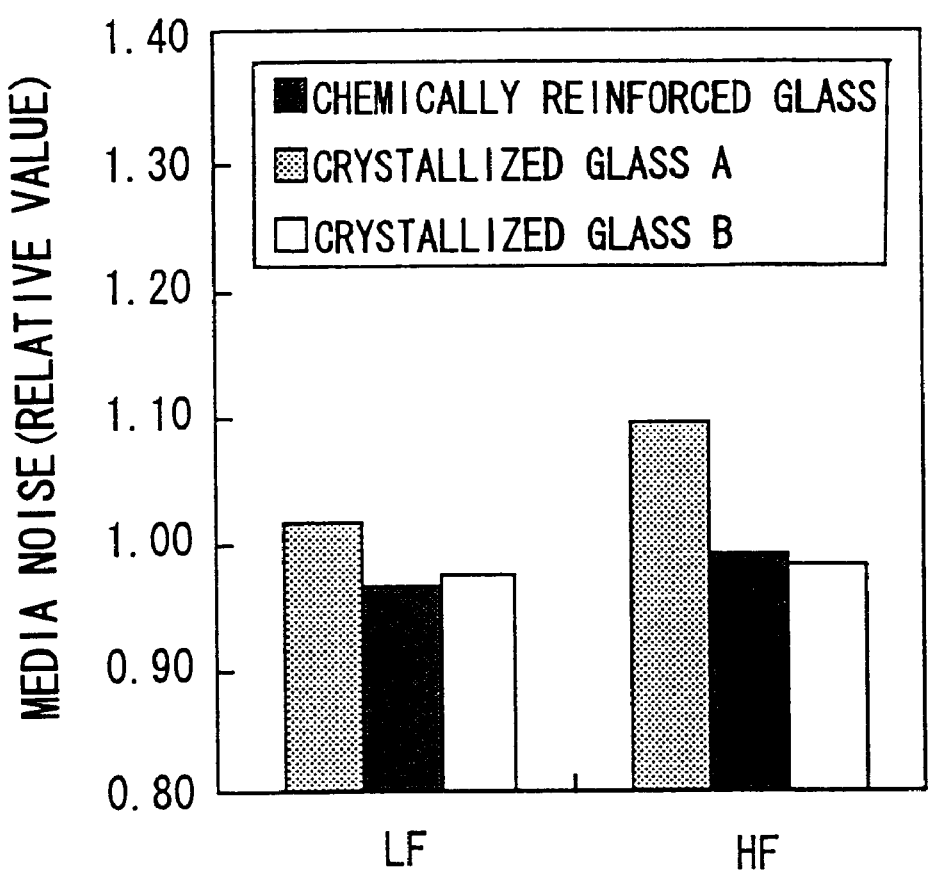
FIG. 12 is a diagram showing measured results of media noise when using crystallized glass and when using chemically reinforced glass for the substrate.

FIG. 12 is a diagram showing measured results of the media noise (relative value) for a low-frequency region LF and a high-frequency region HF when using the crystallized glass A and when using the chemically reinforced glass for the substrate 1. The measured results shown in FIG. 12 were obtained with respect to a magnetic recording medium which is produced by heating the substrate 1 made of the various kinds of materials to approximately 180° C., then carrying out DC sputtering to successively form the NiAl seed layer 2 to a thickness of 60 nm, the $Cr_{90}Mo_{10}$ underlayer 3 to a thickness of 4 nm, the CoCr intermediate layer 4 to a thickness of 1.5 nm, the CoCrPtB magnetic layer 5, and the C protection layer 6. The gas pressure was set to 5 mTorr for the formation of the layers from the NiAl seed layer 2 up to the CoCrPtB magnetic layer 5, and set to 8 mTorr for the formation of the C protection layer 6. The media noise was measured using a GMR head. The data shown in FIG. 12 correspond to the data when the heating condition is "1", and are indicated in relative values by taking the media noise as being "1" when the heating condition is "0.8". The difference between the heating conditions corresponds to the difference in the heating times.

As may be seen from FIG. 12, compared to the case where the chemically reinforced glass is used for the substrate 1, it was confirmed that the media noise can be reduced by using the crystallized glass A or B for the substrate 1.

Next, a description will be given of a seventh embodiment of the magnetic recording medium according to the present invention. In this seventh embodiment, the magnetic layer 5 is made of a CoCrPtB-based alloy.

The NiAl can be grown by reducing the crystal grain diameter thereof. On the other hand, a CoCr-based alloy added with B promotes Cr segragation to Co grain boundary, and can forcibly reduce the Co grain diameter. The ideal NiAl crystal grain diameter is approximately 8 to 11 nm, and by adding B to the magnetic layer which is made of the CoCr-based alloy, it is possible to form a magnetic layer having approximately the same grain diameter as the NiAl. Generally, it is known that the media noise can be reduced by reducing the magnetic grain diameter. In addition, the magnetic grain tends to grow on a plurality of grains of the underlayer if the grain diameter of the underlayer is smaller than the grain diameter of the magnetic layer, and on the other hand, a plurality of magnetic grains tend to grown on one grain of the underlayer if the grain diameter of the underlayer is greater than the grain diameter of the magnetic layer. Hence, it is impossible to reduce the media noise in either of these cases. But in this embodiment, the media noise of the magnetic recording medium is reduced by the combination of the NiAl and the CoCrPtB-based alloy.

Preferably, the Cr content of the magnetic layer 5 which is made of the CoCrPtB-based alloy is approximately 18 to 24 at %. If the Cr content is less than 18 at %, the Cr segregation to the Co grain boundary does not sufficiently occur, and it is impossible to effectively reduce the media noise due to the reduced intergrannular interaction of the Co grains. On the other hand, if the Cr content is greater than 24 at %, a saturation magnetization Ms decreases, and it becomes necessary to increase the thickness of the magnetic layer 5 in order to obtain a sufficiently large reproduced output. However, the resolving power deteriorates if the thickness of the magnetic layer 5 is increased. Particularly in the case of the magnetic layer which is made of the CoCr-based alloy added with B, the in-plane crystal orientation of the crystallographic c-axis of Co deteriorates when the thickness of this magnetic layer is increased, thereby increasing the media noise, deteriorating the coercivity in the in-plane direction, and deteriorating the S/N ratio. Therefore, for these reasons, the Cr content within the CoCrPtB-based alloy which forms the magnetic layer 5 is preferably set in a range of approximately 18 to 24 at %.

Furthermore, the Pt content of the magnetic layer 5 which is made of the CoCrPtB-based alloy is preferably approximately 8 to 12 at %. When using the NiAl seed layer 2, the (211) face of the NiAl is oriented parallel to the surface of the substrate 1 (hereinafter simply referred to as the substrate surface), and the Co of the magnetic layer which is made of Co has the (10-10) face preferentially oriented parallel to the substrate surface. In the epitaxial growth for this case, the Co magnetic layer does not make a bi-crystal growth, and the apparent anisotropic magnetization Hk will not deteriorate. For this reason, compared to the case where the Cr underlayer is used and the Co is oriented with respect to the (11-20) face, for example, it is possible to obtain a high coercivity Hc. Hence, when the coercivity Hc is controlled by the Pt content added to the Co magnetic layer, an appropriate Pt content is set in a range of approximately 8 to 12 at %. If the Pt content is less than this range, the coercivity Hc decreases, the transition region at the recording bit boundary cannot be made sharp, and a sufficiently large resolving power cannot be obtained. On the other hand, if the Pt content exceeds this range, the coercivity Hc becomes too high, and it is impossible to obtain a sufficiently large resolving power due to leakage magnetic field from the head. Accordingly, the Pt content within the CoCrPtB-based alloy which forms the magnetic layer 5 is preferably set in a range of approximately 8 to 12 at %.

In addition, the B content of the magnetic layer 5 which is made of the CoCrPtB-based alloy is preferably approximately 1 to 6 at %. In the case of the magnetic layer made of the CoCrPt-based alloy, it is possible to make the grain diameter sufficiently small when the B content added thereto is 1 at %, and the grain diameter can further be reduced by further increasing the B content. However, when the B content exceeds 6 at %, the saturation magnetization Ms decreases. For this reason, the B content within the CoCrPtB-based alloy which forms the magnetic layer 5 is preferably set in a range of approximately 1 to 6 at %.

Furthermore, the Co content of the magnetic layer 5 which is made of the CoCrPtB-based alloy is preferably approximately 60 at %. With this Co content, it is possible to obtain a desired saturation magnetization Ms even when the thickness of the magnetic layer 5 is made small.

On the other hand, the crystal grain diameter of the magnetic layer 5 is desirably close to the crystal grain diameter of the seed layer 2. In other words, it is desirable that the crystal grain diameter of the magnetic layer 5 which is made of the CoCrPtB-based alloy is approximately 8 to 11 nm, and that the grain diameter ratio with respect to the NiAl seed layer 2 is approximately 0.8 to 1.4. The grain diameter ratio in this case refers to G2/G1, where G1 denotes the crystal grain diameter of the magnetic layer 5 and G2 denotes the crystal grain diameter of the NiAl seed layer 2.

The magnetic layer 5 may have a multi-layer structure in which each layer of the multi-layer structure is made of a CoCrPtB-based alloy. For example, of the layers forming the multi-layer structure of the magnetic layer 5, the Cr content of the lower layer closer to the substrate 1 may be larger than the Cr content of the upper layer farther away from the substrate 1, the interaction of the magnetic grains is small and the thickness of the magnetic layer 5 can be made small. Moreover, of the layers forming the multi-layer structure of the magnetic layer 5, two adjacent layers may have a nonmagnetic layer interposed therebetween to have a structure similar to the multi-layer structure of the seed layer 2 shown in FIG. 9.

Figure 13:
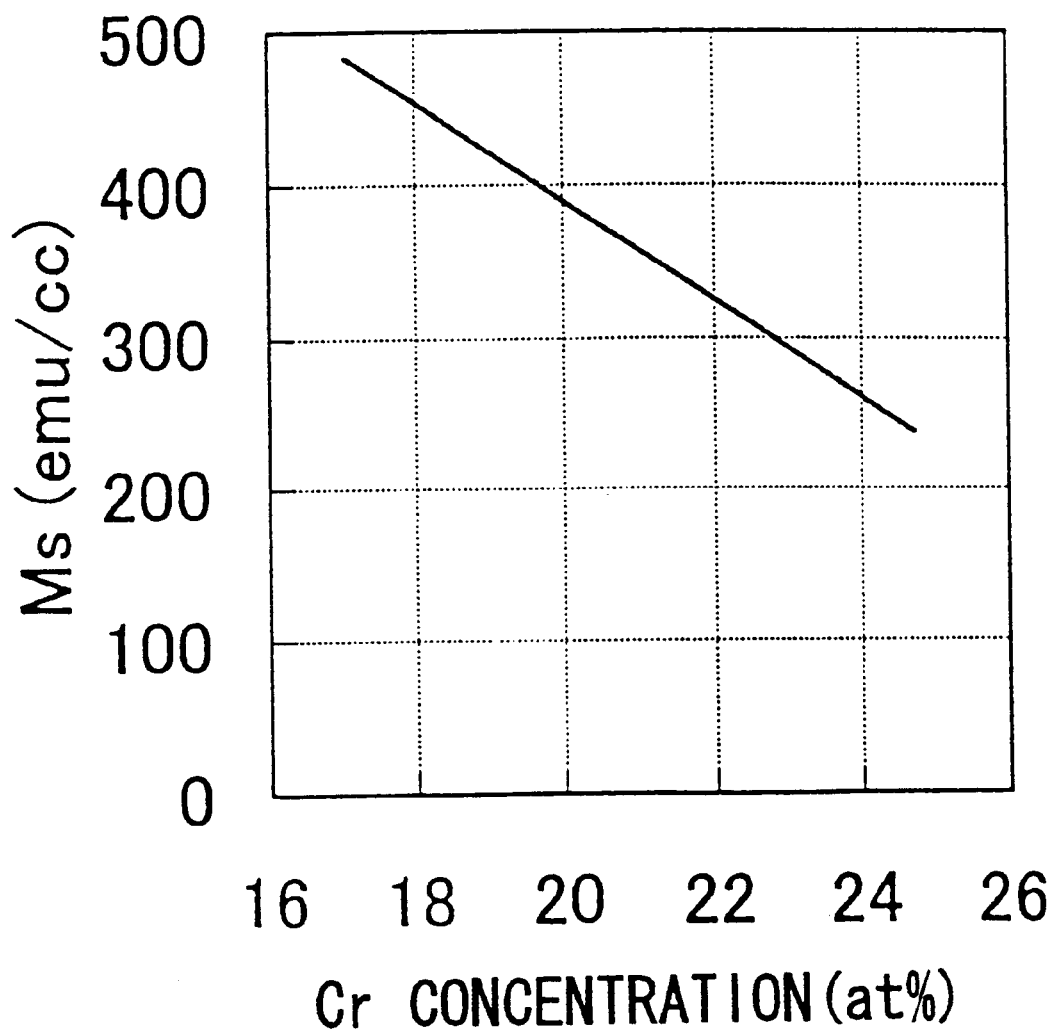
FIG. 13 is a diagram showing a Cr concentration dependency of saturation magnetization.

FIG. 13 is a diagram showing a Cr concentration dependency of the saturation magnetization Ms. In FIG. 13, the ordinate indicates the saturation magnetization Ms (emu/cc), and the abscissa indicates the Cr concentration (at %). The results shown in FIG. 13 were obtained by making measurements with respect to the seventh embodiment of the magnetic recording medium which is produced under conditions similar to those of the first embodiment of the producing method.

In this embodiment, the crystal orientation of the magnetic layer 5 which is made of the CoCrPtB-based alloy deteriorates unless the thickness thereof is set to approximately 20 nm or less. In addition, in order to obtain a sufficiently large reproduced output even when the thickness of the magnetic layer 5 is 20 nm or less, the saturation magnetization Ms needs to be 200 emu/cc or greater. Hence, as may be seen from FIG. 13, it was confirmed that the Cr concentration must be approximately 24 at % or less in order to satisfy these conditions.

Figure 14:
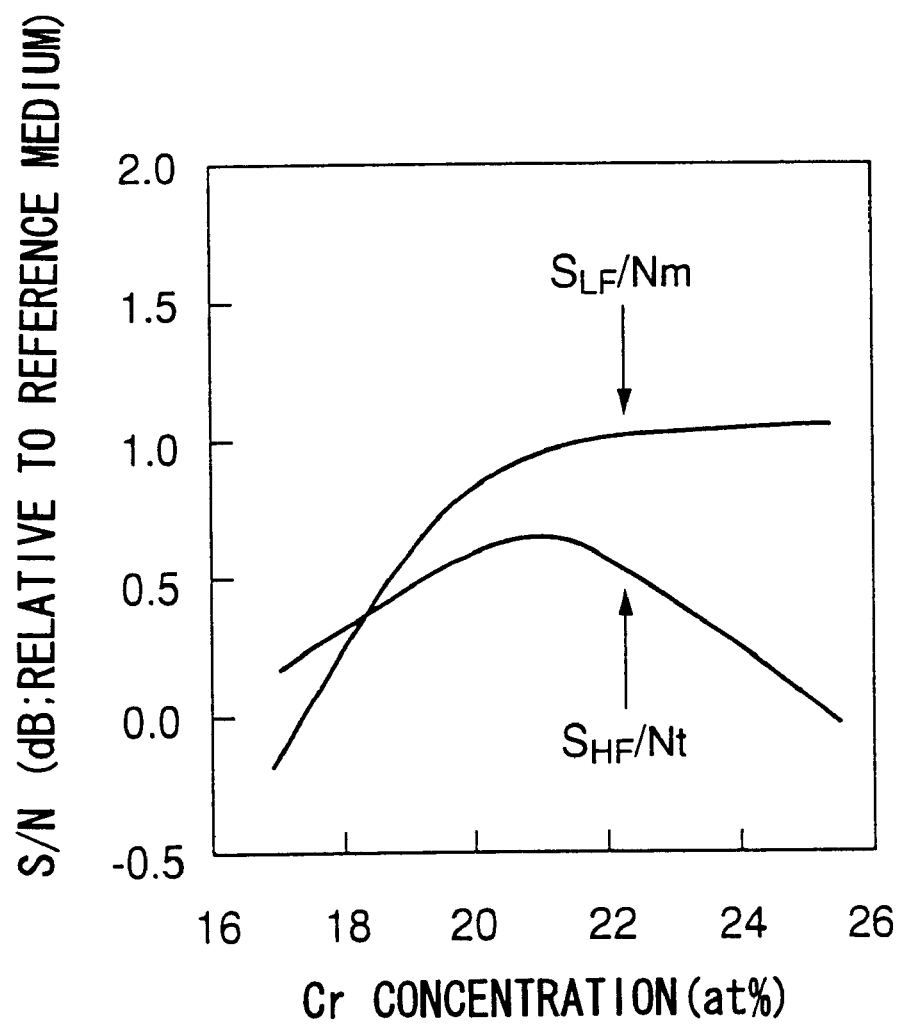
FIG. 14 is a diagram showing a Cr concentration dependency of normalized noise.

FIG. 14 is a diagram showing a Cr concentration dependency of the normalized noise. In FIG. 14, the ordinate indicates the normalized noise, that is, the S/N ratio (dB) with respect to a reference medium, and the abscissa indicates the Cr concentration (at %). In FIG. 14, $S_{LF}/Nm$ indicates the low-frequency media S/N ratio (isolated wave media S/N ratio Siso/Nm), and $S_{HF}/Nt$ indicates the high-frequency total S/N ratio. The high-frequency total S/N ratio $S_{HF}/Nt$ includes the isolated wave medial S/N ratio $S_{LF}/Nm$, the noise of a head IC and the like. The results shown in FIG. 14 were obtained by making measurements with respect to the seventh embodiment of the magnetic recording medium which is produced under conditions similar to those of the first embodiment of the producing method. In addition, the S/N ratio is indicated with reference to the reference medium which is produced similarly to the above except for the different composition of the CoCrPtB magnetic layer.

As may be seen from FIG. 14, it was confirmed that a satisfactory normalized S/N ratio cannot be obtained if the Cr concentration within the magnetic layer 5 which is made of the CoCrPtB-based alloy is too large or too small, and that a satisfactory normalized S/N ratio is obtained when the Cr concentration is set in a range of approximately 18 to 24 at %.

Figure 15B:
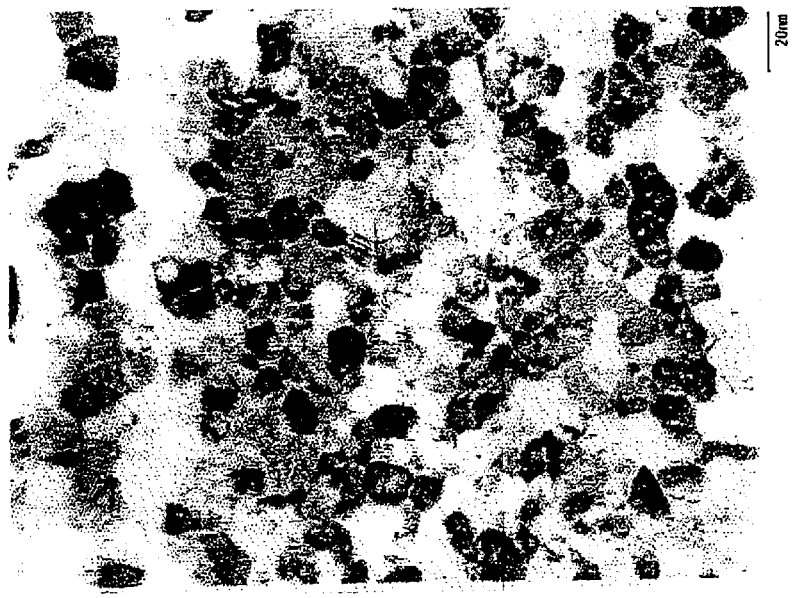
FIGS. 15A and 15B are diagrams showing TEM micrographs of a medium surface.
Figure 15A:

FIGS. 15A and 15B are diagrams showing TEM micrographs of a medium surface. First, an Al substrate plated with nonmagnetic NiP was heated to 220° C., and DC sputtering was carried out to successively stack on the substrate an underlayer made of a Cr-based alloy, an intermediate layer made of a CoCr-based alloy, and a magnetic layer made of a CoCrPtB-based alloy. A first sample medium was made by setting the B content within the magnetic layer to 0 at %, and a second sample medium was made by setting the B content within the magnetic layer to 1 at %. FIG. 15A shows the TEM micrograph of the medium surface of the first sample medium in which the B content of the magnetic layer is 0 at %, and FIG. 15B shows the TEM micrograph of the medium surface of the second sample medium in which the B content of the magnetic layer is 1 at %. The magnetic grain diameter is 13.1 nm and large in the case of the first sample medium shown in FIG. 15A, but it was confirmed that the magnetic grain diameter is 9.5 nm and small in the case of the second sample medium shown in FIG. 15B by adding 1 at % of B in the magnetic layer.

Figure 16:
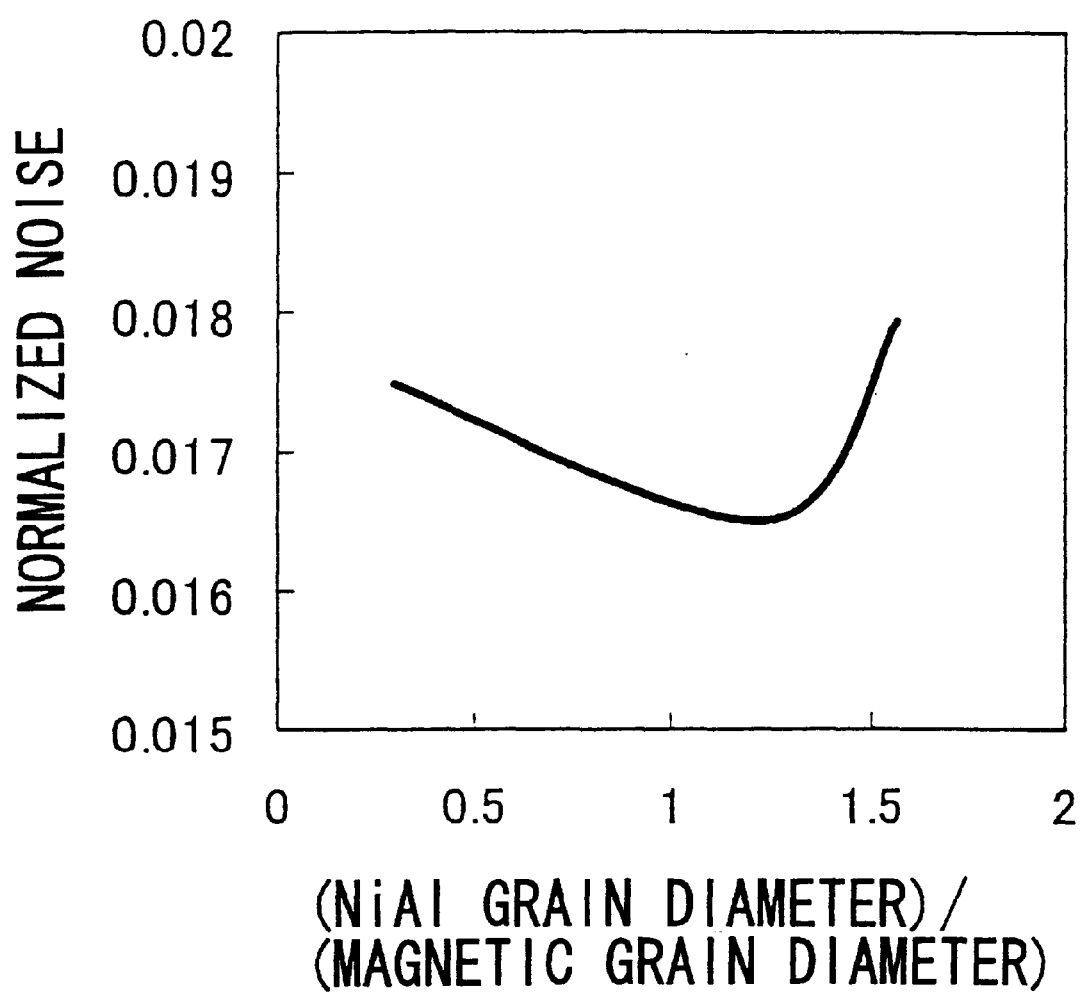
FIG. 16 is a diagram showing a grain diameter ratio dependency of the normalized noise.

FIG. 16 is a diagram showing a grain diameter ratio dependency of the normalized noise. In FIG. 16, the ordinate indicates the normalized noise $(Nm/S_{LF})$, and the abscissa indicates the grain diameter ratio of the seed layer 2 and the magnetic layer 5. The grain diameter ratio in this case refers to G2/G1, where G1 denotes the crystal grain diameter of the magnetic layer 5 and G2 denotes the crystal grain diameter of the NiAl seed layer 2. The results shown in FIG. 16 were obtained by making measurements with respect to the seventh embodiment of the magnetic recording medium which is produced under conditions similar to those of the first embodiment of the producing method. The grain diameter ratio was varied by varying the thickness of the NiAl seed layer 2. Further, the crystal grain diameter was obtained by carrying out a statistical analysis based on the TEM micrographs and obtaining an average grain diameter. As may be seen from FIG. 16, it was confirmed that the normalized noise is satisfactorily suppressed when the grain diameter ratio is in the range of approximately 0.8 to 1.4.

Next, a description will be given of an eighth embodiment of the magnetic recording medium according to the present invention. In this embodiment, the underlayer 3 which is provided between the seed layer 2 and the magnetic layer 5 is made of a nonmagnetic Cr-based alloy. In the structure shown in FIG. 1 described above, the underlayer 3 is provided between the seed layer 2 and the intermediate layer 4.

Cr has a bcc structure, and the crystal structure of the Cr is extremely close to the B2 structure of the NiAl which is used for the seed layer 2. The lattice constant of the Cr is also close to the lattice constant of the NiAl. In addition, Co easily grows epitaxially on the Cr-based alloy, thereby making is possible to easily grow a low-noise Co-based magnetic layer 5. Furthermore, when an additive is added to the Cr and the lattice interval of the Cr-based underlayer 3 is widened in order to make the lattice interval of the Cr-based underlayer 3 close to the lattice interval of the Co-based magnetic layer 5, it is possible to improve particularly the coercivity Hc. For example, Mo, Ti, V, W or the like may be used as the additive added to the Cr. Of such additives, a combination of a plurality of elements may be added to the Cr. when improving the coercivity Hc by adding Pt to the Co-based magnetic layer 5, it is desirable to set the amount of the additive which is added to the Cr in a range of 0 to 20 at % in order to increasing the lattice interval of the Cr-based alloy which is used for the underlayer 3 according to the increasing lattice interval of the Co due to the addition of Pt thereto.

When the thickness of the Cr-based underlayer 3 is set large, the crystal orientation of the (211) face of the NiAl forming the NiAl seed layer 2 under the Cr-based underlayer 3 is disturbed, and the crystal grain diameter consequently increases. Hence, the thickness of the Cr-based underlayer 3 is preferably set in a range of approximately 1 to 8 nm.

The Cr-based underlayer 3 may have a multi-layer structure which is made up of a plurality of underlayers. In this case, of the plurality of underlayers forming the multi-layer structure of the Cr-based underlayer 3, it is possible to form the underlayer closer to the NiAl seed layer 2 by a Cr-based alloy having a lattice interval close to that of the NiAl, and to form the underlayer closer to the Co-based magnetic layer 5 by a Cr-based alloy having a lattice interval close to that of the Co. By taking such measures, it is possible to smoothly grow the NiAl, Cr and Co, and to form a Co-based magnetic layer 5 having both satisfactory crystal properties and satisfactory crystal orientation. The lattice interval of each of the underlayers forming the multi-layer structure of the Cr-based underlayer 3 may be controlled, by setting the amount of the additive which is added to the Cr for the purposes of increasing the lattice interval larger in the upper underlayer of the multi-layer structure than in the lower underlayer of the multi-layer structure.

Figure 17:
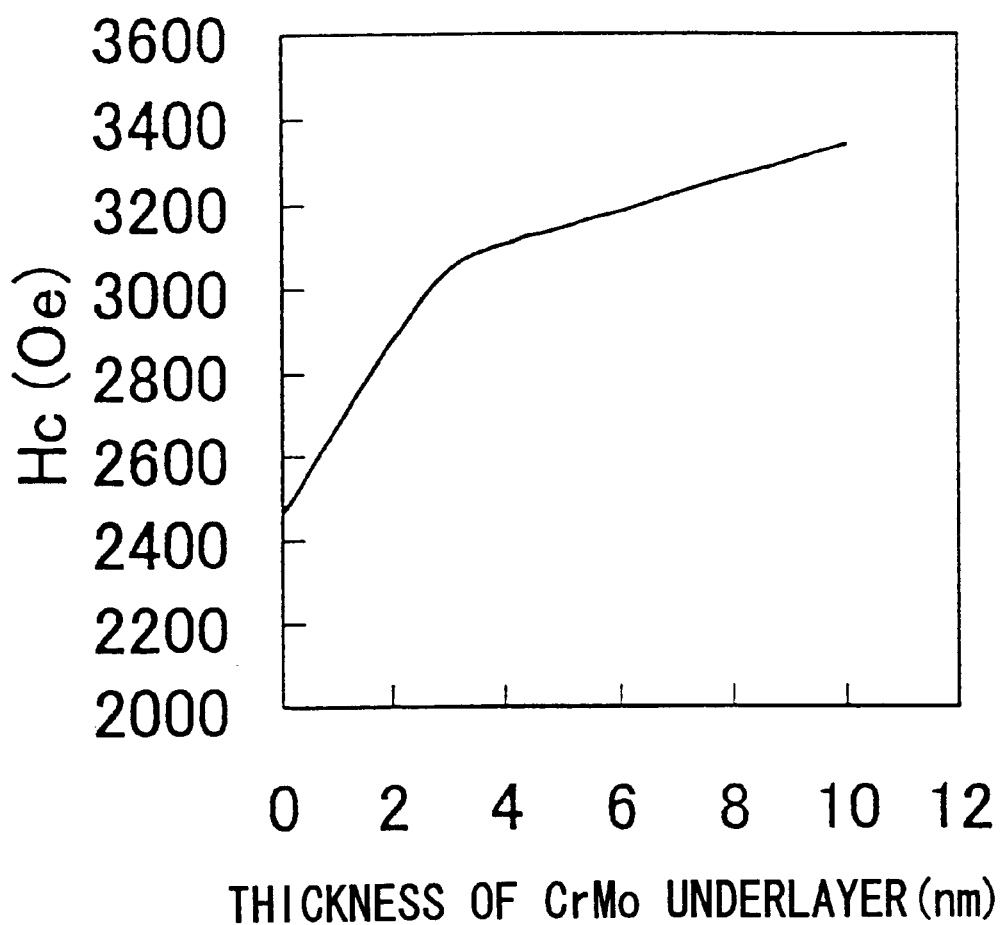
FIG. 17 is a diagram showing an underlayer thickness dependency of coercivity.
Figure 18:
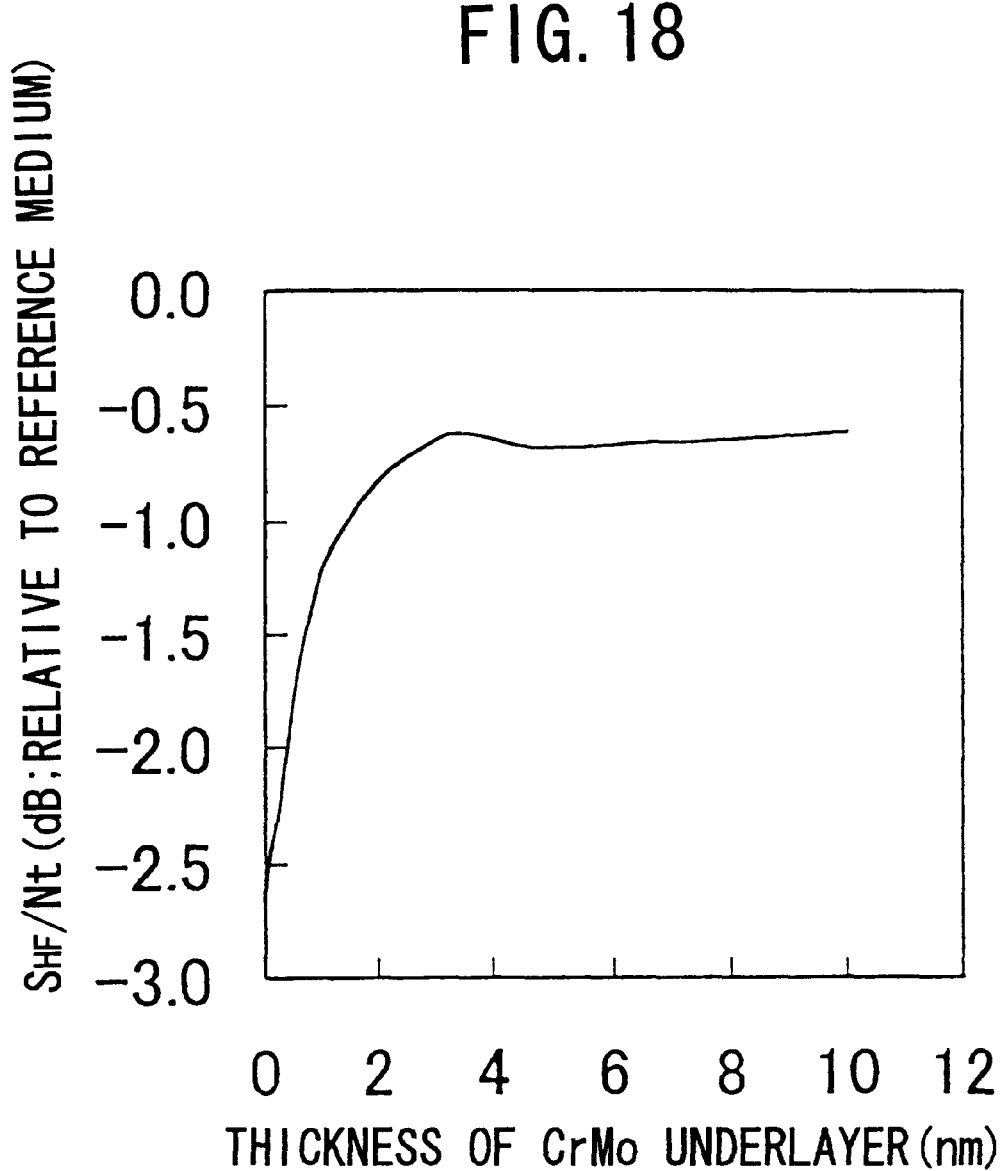
FIG. 18 is a diagram showing an underlayer thickness dependency of high-frequency total signal-to-noise ratio.

FIG. 17 is a diagram showing an underlayer thickness dependency of the coercivity Hc. In addition, FIG. 18 is a diagram showing an underlayer thickness dependency of the high-frequency total S/N ratio $S_{HF}$/Nt. The high-frequency total S/N ratio $S_{HF}$/Nt shown in FIG. 18 is indicated with reference to a high-frequency total S/N ratio $S_{HF}$/Nt of a reference medium which is made similarly as described above except for the different composition of the CoCrPtB magnetic layer. The results shown in FIGS. 17 and 18 were obtained by making magnetic recording media having the CrMo underlayers 3 with different thicknesses under the same conditions as in the first embodiment of the producing method, and making the measurements using a GMR head. As may be seen from FIG. 17, it was confirmed that the coercivity Hc is improved by providing the CrMo underlayer 3. Moreover, as may be seen from FIG. 18, it was confirmed that the S/N ratio is improved by providing the CrMo underlayer 3, but that the S/N ratio deteriorates if the thickness of the CrMo underlayer 3 is set excessively large. Therefore, it was confirmed that the thickness of the CrMo underlayer 3 is preferably set in a range of approximately 1 to 8 nm.

Figure 19:
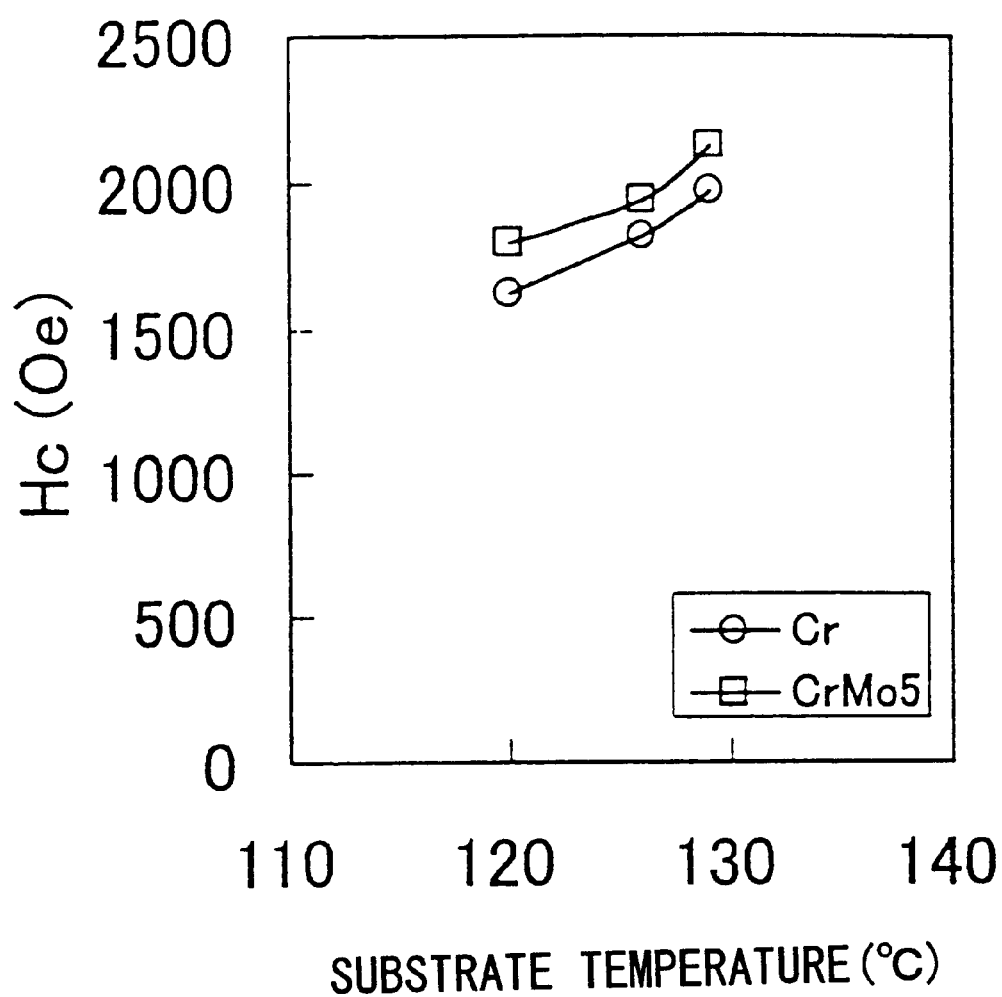
FIG. 19 is a diagram showing a substrate temperature dependency of the coercivity when the underlayer is provided for different amounts of additives.
Figure 20:
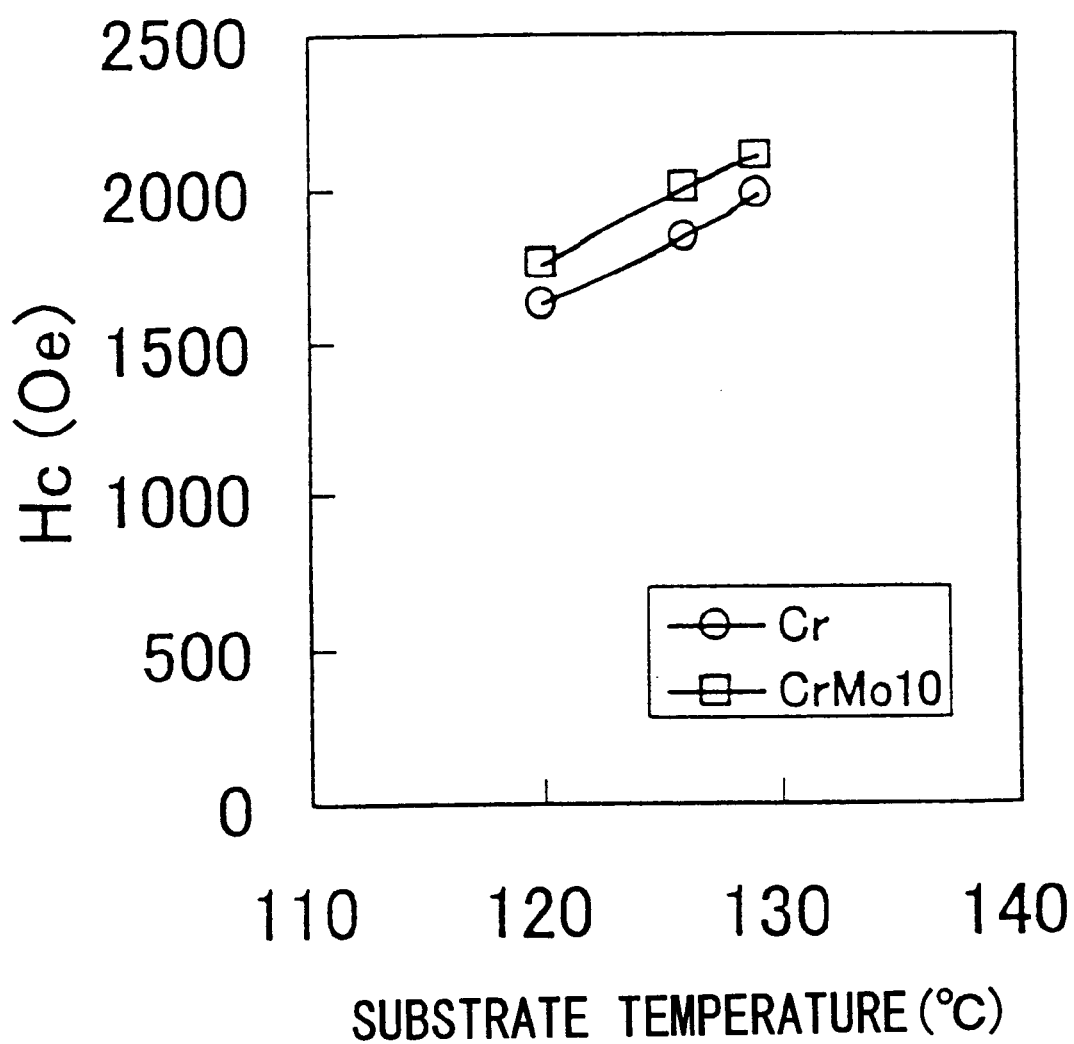
FIG. 20 is a diagram showing the substrate temperature dependency of the coercivity when the underlayer is provided for different amounts of additives.

FIGS. 19 and 20 are diagrams showing substrate temperature dependencies of the coercivity Hc when the Cr-based underlayer 3 is provided, for different amounts of additives added to the Cr. The results shown in FIGS. 19 and 20 were obtained by making magnetic recording media at different substrate temperatures for different amounts of additives added to the Cr of the Cr-based underlayer 3, and making the measurements using a GMR head. In FIG. 19, a symbol "○" indicates the data for a case where no additive is added to the Cr of the Cr-based underlayer 3, and a symbol "□" indicates the data for a case where the Mo content added to the Cr of the Cr-based underlayer 3 is 5 at %. In FIG. 20, a symbol "○" indicates the data for a case where no additive is added to the Cr of the Cr-based underlayer 3, and a symbol "□" indicates the data for a case where the Mo content added to the Cr of the Cr-based underlayer 3 is 10 at %. As may be seen from FIGS. 19 and 20, it was confirmed that the lattice matching is achieved and the coercivity Hc is improved when Mo is added to the Cr-based underlayer 3 as the additive.

Figure 21:
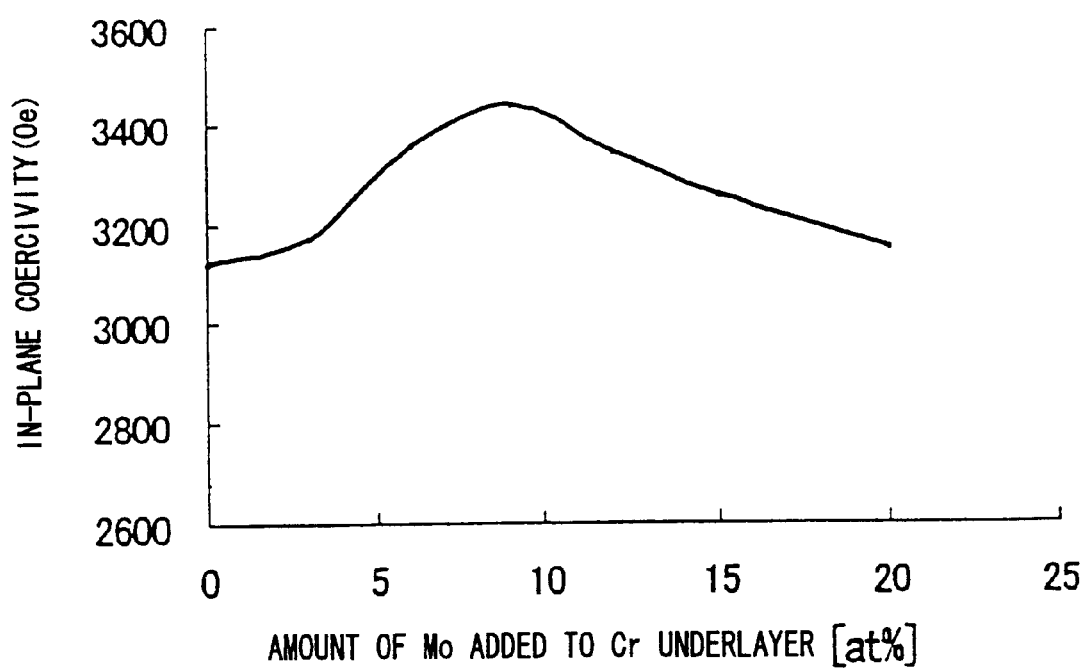
FIG. 21 is a diagram showing a dependency of in-plane coercivity on an amount of Mo added to a Cr underlayer.

FIG. 21 is a diagram showing a dependency of the in-plane coercivity on an amount of Mo added to the Cr-based underlayer 3. The results shown in FIG. 21 were obtained by making magnetic recording media for different amounts of Mo added to the Cr of the Cr-based underlayer 3, and making the measurements using a GMR head. As may be seen from FIG. 21, it was confirmed that, in order to obtain the effect of increasing the in-plane coercivity, the amount of the additive added to the Cr-based underlayer 3, that is, the amount of Mo added to the Cr of the Cr-based underlayer 3, is preferably set in a range of approximately 1 to 20 at %.

FIG. 22 is a diagram showing the in-plane coercivity measured when the CrMo underlayer 3 is made up of a single layer and when made up of two layers. FIG. 22 shows the in-plane coercivities for two cases where the CrMo underlayer 3 is made up of a single layer and the Mo content is 6 at % and 15 at %, respectively. Furthermore, FIG. 22 also shows the in-plane coercivity for a case where the CrMo underlayer 3 is made up of two layers and the Mo content of the upper underlayer is 15 at % and the Mo content of the lower underlayer is 6 at %. As may be seen from FIG. 22, it was confirmed that the CrMo underlayer 3 having the two-layer structure can obtain a higher in-plane coercivity than the CrMo underlayer 3 having the single-layer structure with similar Mo contents.

Next, a description will be given of a ninth embodiment of the magnetic recording medium according to the present invention. In this embodiment, the intermediate layer 4 which is provided between the underlayer 3 and the magnetic layer 5 is made of a CoCr-based alloy. When forming a Co magnetic layer directly on a Cr underlayer, the crystal properties of an initial layer of the Co magnetic layer which is hetero-epitaxially grown is relatively poor. Hence, in this embodiment, the initial layer of the magnetic layer 5 is substantially substituted by the intermediate layer 4 which is made of the nonmagnetic CoCr-based alloy, so as to reduce the media noise. The thickness of the intermediate layer 4 is preferably set in a range of approximately 0.5 to 5 nm, since the crystal orientation deteriorates and the crystal grain diameter becomes large if the thickness of the intermediate layer 4 is too large.

Figure 23:
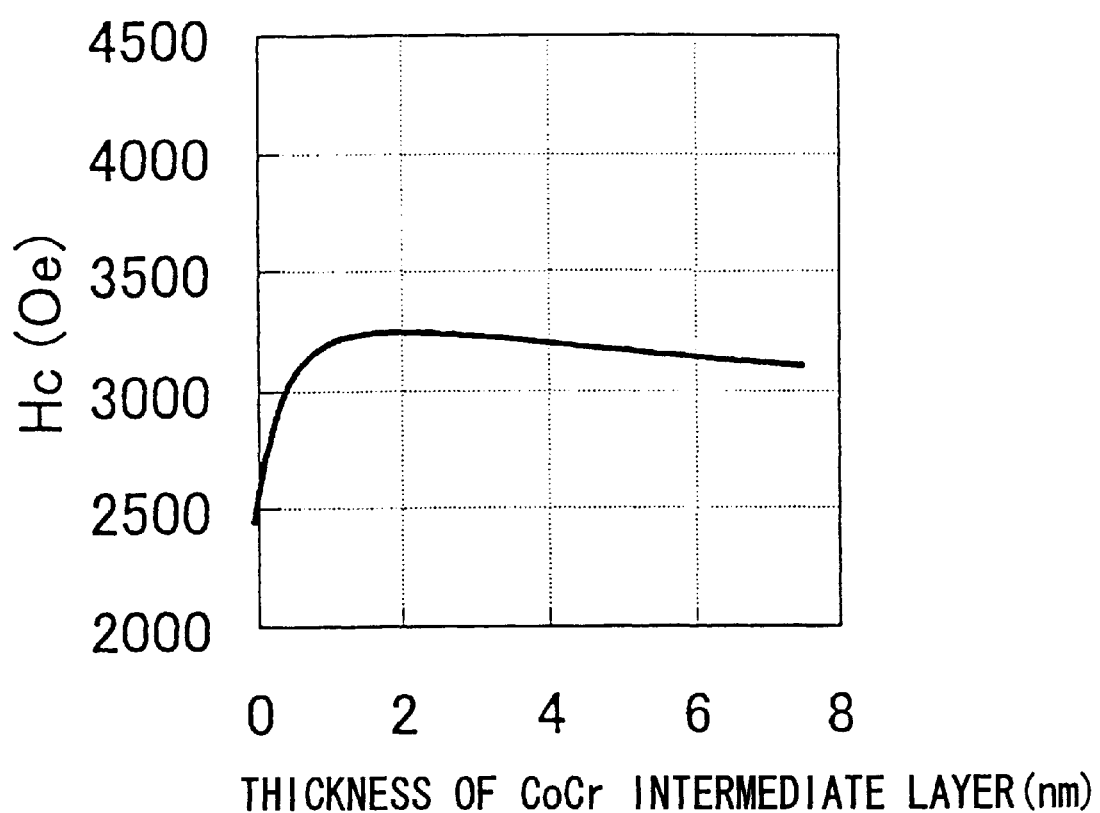
FIG. 23 is a diagram showing an intermediate layer thickness dependency of the coercivity.
Figure 24:
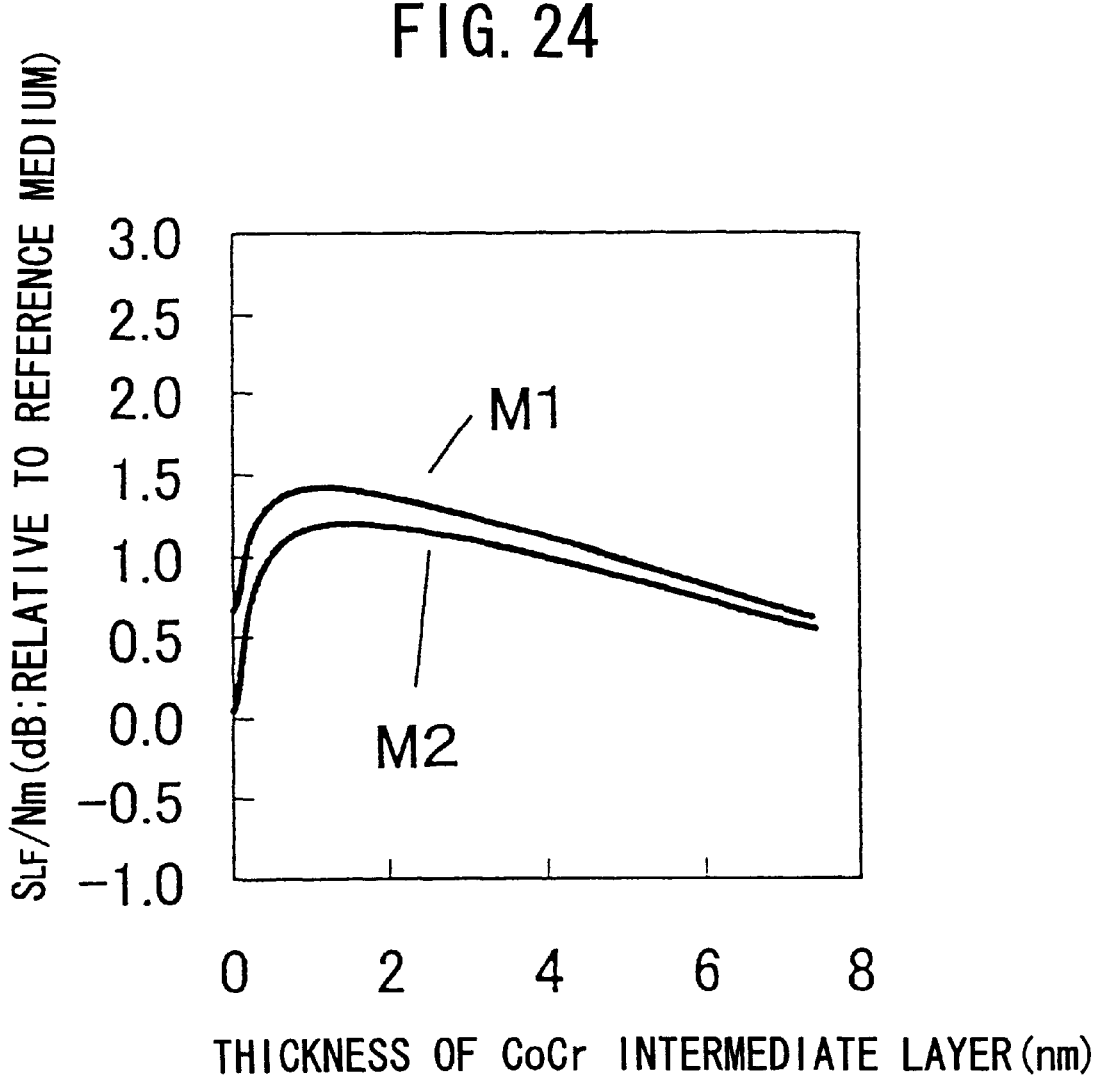
FIG. 24 is a diagram showing an intermediate layer thickness dependency of low-frequency media signal-to-noise ratio.
Figure 25:
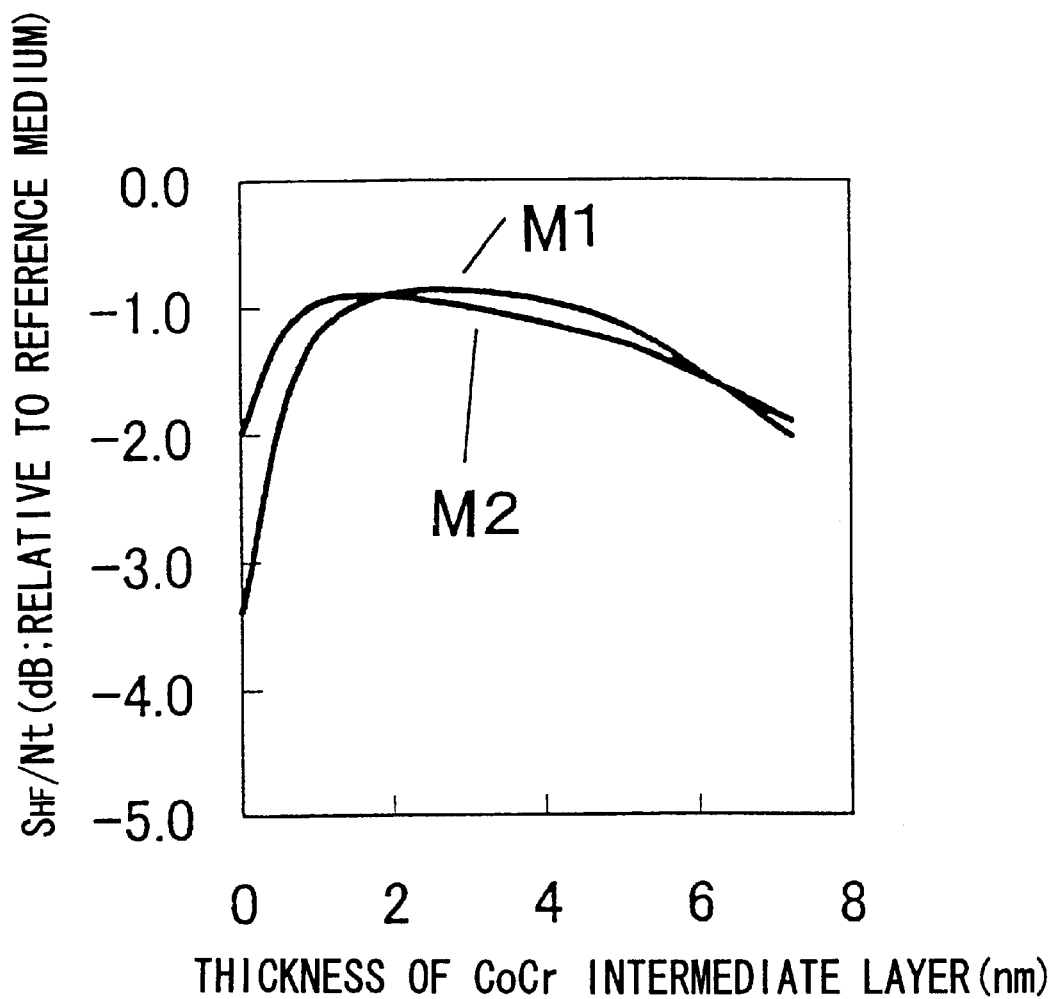
FIG. 25 is a diagram showing an intermediate layer thickness dependency of high-frequency total signal-to-noise ratio.

FIG. 23 is a diagram showing an intermediate layer thickness dependency of the coercivity Hc, for the intermediate layer 4 which is made of the CoCr-based alloy. FIG. 24 is a diagram showing an intermediate layer thickness dependency of the low-frequency media S/N ratio $S_{LF}$/Nm, for the intermediate layer 4 which is made of the CoCr-based alloy. The low-frequency media S/N ratio $S_{LF}$/Nm shown in FIG. 24 is indicated with reference to a low-frequency media S/N ratio $S_{LF}$/Nm of a reference medium which is made similarly as described above except for the different composition of the CoCrPtB magnetic layer. Further, FIG. 25 is a diagram showing an intermediate layer thickness dependency of the high-frequency total S/N ratio $S_{HF}$/Nt, for the intermediate layer 4 which is made of the CoCr-based alloy. The high-frequency total S/N ratio $S_{HF}$/Nt shown in FIG. 25 is indicated with reference to a high-frequency total S/N ratio $S_{HF}$/Nm of the reference medium which is made similarly as described above except for the different composition of the CoCrPtB magnetic layer, and is the same as the reference medium used to obtain the data shown in FIG. 24. The results shown in FIGS. 23 through 25 were obtained by making magnetic recording media having the intermediate layer 4 which is made of the CoCr-based alloy with different thicknesses under the same conditions as in the first embodiment of the producing method, and making the measurements using a GMR head. A case where the thickness of the intermediate layer 4 is zero corresponds to the case where no intermediate layer 4 is provided. In addition, magnetic materials M1 and M2 in FIGS. 24 and 25 respectively correspond to cases where the Cr content of the magnetic layer 5 is 24 at % and 22 at %, respectively.

As may be seen particularly from FIGS. 24 and 25, it was confirmed that the S/N ratio is greatly improved by providing the intermediate layer 4 which is made of the nonmagnetic CoCr-based alloy, regardless of the magnetic material used for the magnetic layer 5. Furthermore, as may be seen from FIGS. 23 through 25, it was also confirmed preferable to set the thickness of the intermediate layer 4 in a range of approximately 0.5 to 5 nm, because the S/N ratio deteriorates if the thickness of the intermediate layer 4 is too large.

Next, a description will be given of a second embodiment of the method of producing the magnetic recording medium according to the present invention. In order to produce a magnetic recording medium having very good coercivity, squareness ratio and noise characteristic, it is also important to appropriately set various conditions at the time of the production.

In this embodiment of the producing method, an in-line type DC magnetron sputtering apparatus is used. Each layer of the magnetic recording medium is deposited while the substrate is stationary. The Ar gas pressure during the DC sputtering is preferably set in a range of approximately 3 to 10 mTorr.

In addition, the growing temperatures of the seed layer 2 and the magnetic layer 5 are also important factors which affect the characteristics of the magnetic recording medium. When the growing temperature of the NiAl seed layer 2 is lower than 200° C., a sufficient crystallization does not occur, thereby making it impossible to obtain a satisfactory coercivity. On the other hand, when the growing temperature of the NiAl seed layer 2 is higher than 280° C., the crystal grains of the NiAl seed layer 2 become large, and the media noise increases. For this reason, the growing temperature of the NiAl seed layer 2 is preferably set in a range of approximately 200° C. to 280° C. Moreover, when the growing temperature of the magnetic layer 5 is lower than 160° C., the Cr segregation to the grain boundaries becomes insufficient within the magnetic layer 5, and the interaction of the Co grains becomes large, thereby resulting in reduced coercivity and increased media noise. On the other hand, when the growing temperature of the magnetic layer 5 is higher than 220° C., the crystal grains of the magnetic layer 5 become large, thereby resulting in reduced coercivity and increased media noise. therefore, the growing temperature of the magnetic layer 5 is preferably set in a range of approximately 160° C. to 220° C. Unless the growing temperatures of the NiAl seed layer 2 and the agnetic layer 5 are set within the preferable ranges described above, it is impossible to obtain a sufficient static magnetic characteristic and S/N ratio.

Figure 26:
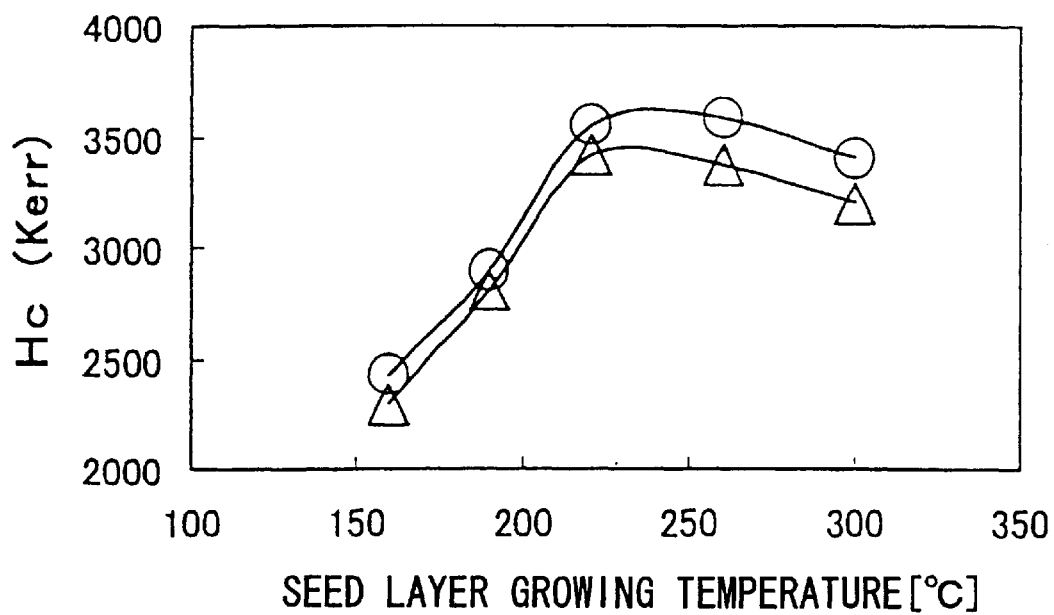
FIG. 26 is a diagram showing a dependency of the coercivity on seed layer growing temperature.
Figure 27:
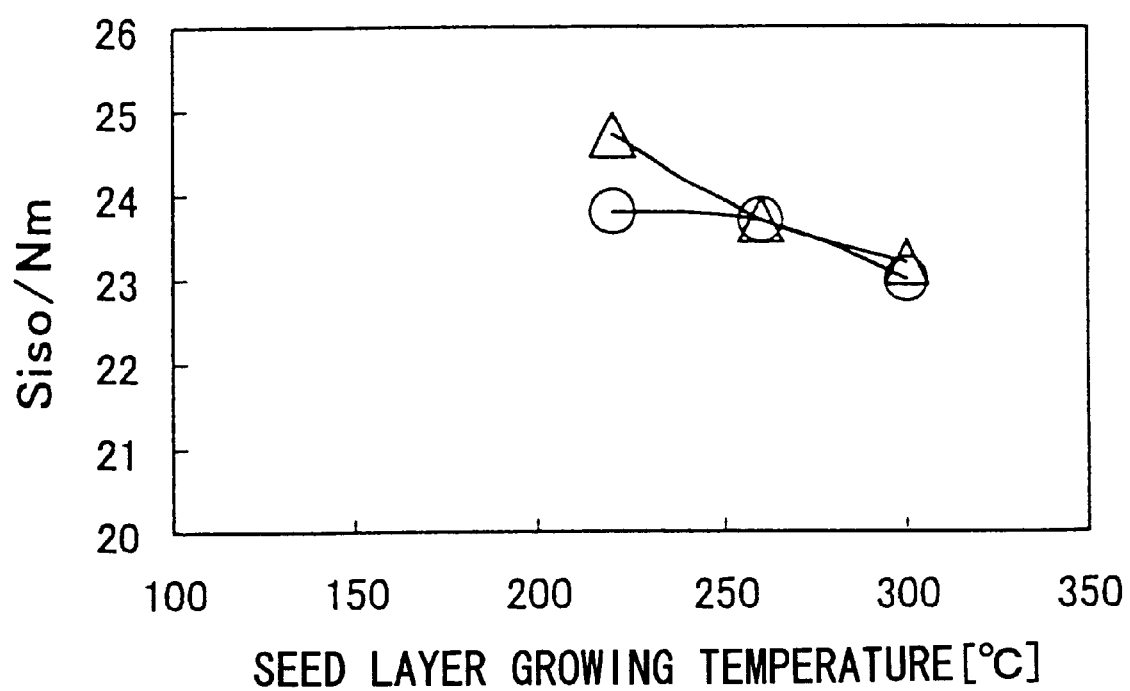
FIG. 27 is a diagram showing a dependency of isolated media signal-to-noise ratio on the seed layer growing temperature.

FIG. 26 is a diagram showing a dependency of the coercivity Hc on the seed layer growing temperature. FIG. 27 is a diagram showing a dependency of the isolated media S/N ratio Siso/Nm on the seed layer growing temperature. The results shown in FIGS. 26 and 27 were obtained by producing magnetic recording media under the following conditions and making measurements using a GMR head. In this embodiment, after the glass substrate 1 is heated to approximately 220° C., DC sputtering is carried out to successively form the NiAl seed layer 2 to a thickness of 60 nm, the $Cr_{90}Mo_{10}$ underlayer 3 to a thickness of 4 nm, the CoCr intermediate layer 4 to a thickness of 1.5 nm, the CoCrPtB magnetic layer 5, and the C protection layer 6. The gas pressure was set to 5 mTorr for the formation of the layers from the NiAl seed layer 2 up to the CoCrPtB magnetic layer 5, and the gas pressure was set to 8 mTorr for the formation of the C protection layer 6. Various heating conditions were set with respect to the NiAl seed layer 2, and changes in the coercivity Hc and the isolated wave media S/N ratio Siso/Nm were investigated for two kinds of compositions of the magnetic layer 5. In FIGS. 26 and 27, the symbols "Δ" and "○" respectively indicate the data obtained for the two kinds of compositions of the magnetic layer 5. As may be seen from FIGS. 26 and 27, it was confirmed that both the coercivity Hc and the isolated wave media S/N ratio Siso/Nm are improved when the growing temperature of the NiAl seed layer 2 is set in a range of approximately 200° C. to 280° C.

Figure 28:
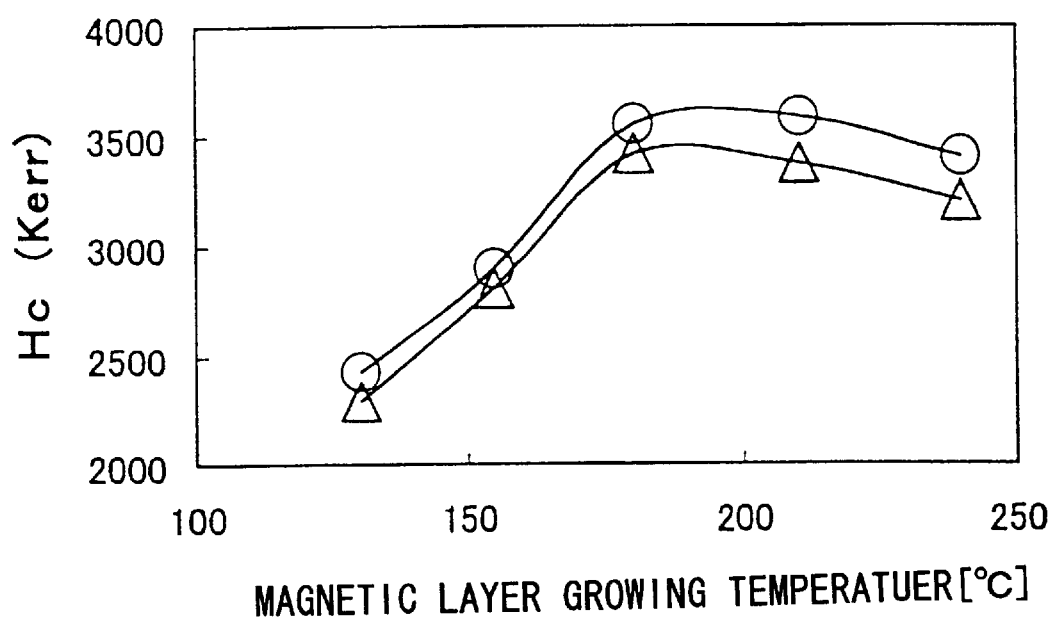
FIG. 28 is a diagram showing a dependency of coercivity on magnetic layer growing temperature.
Figure 29:
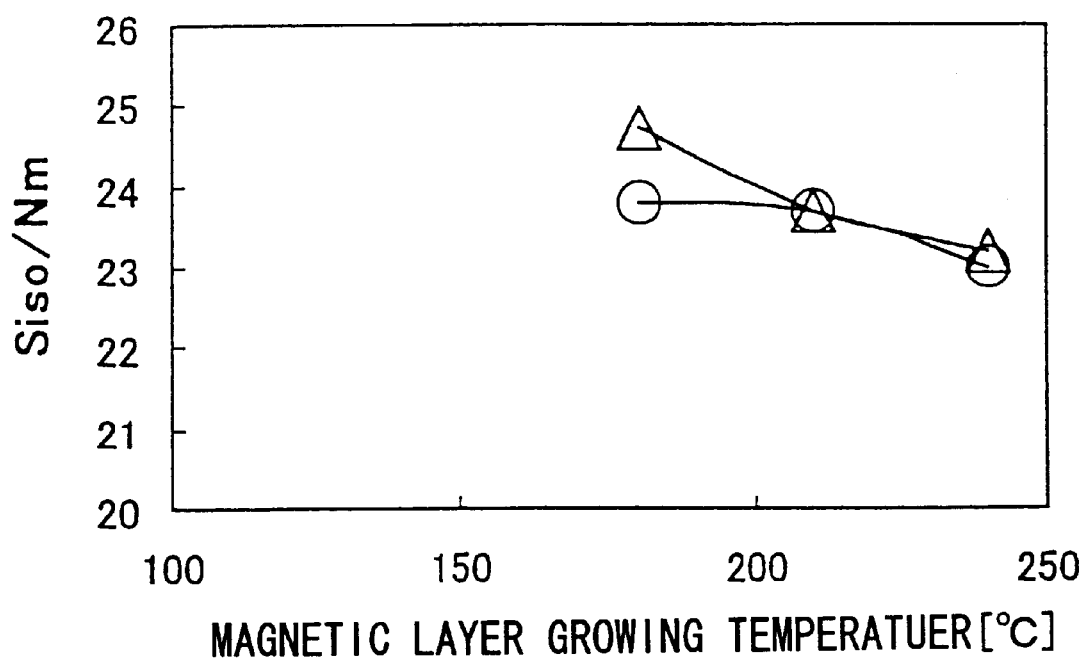
FIG. 29 is a diagram showing a dependency of the isolated media signal-to-noise ratio on the magnetic layer growing temperature.

FIG. 28 is a diagram showing a dependency of the coercivity Hc on the magnetic layer growing temperature. FIG. 29 is a diagram showing a dependency of the isolated media S/N ratio Siso/Nm on the magnetic layer growing temperature. The results shown in FIGS. 28 and 29 were obtained by setting the conditions identical to those used to obtain the results shown in FIGS. 26 and 27 described above. In addition, various heating conditions were set with respect to the magnetic layer 5, and changes in the coercivity Hc and the isolated wave media S/N ratio Siso/Nm were investigated for two kinds of compositions of the magnetic layer 5. In FIGS. 28 and 29, the symbols "Δ" and "○" respectively indicate the data obtained for the two kinds of compositions of the magnetic layer 5. As may be seen from FIGS. 28 and 29, it was confirmed that both the coercivity Hc and the isolated wave media S/N ratio Siso/Nm are improved when the growing temperature of the magnetic layer 5 is set in a range of approximately 160° C. to 220° C.

In addition, when an annealing process is carried out after the formation of the magnetic layer 5, it is possible to further improve the characteristics of the magnetic recording medium. It is possible to promote the Cr segregation of the magnetic layer 5 by carrying out the annealing process, thereby making it possible to stably control the further reduction of the crystal grain diameter of the magnetic layer 5. Of course, the annealing process may be carried out after formation of the protection layer 6.

FIG. 30 is a diagram showing a static magnetic characteristic of the magnetic recording medium obtained when the annealing process is carried out after the formation of the magnetic layer 5. The results shown in FIG. 30 were obtained by producing the magnetic recording medium under the conditions of this embodiment, and making the measurements using a GMR head. In this embodiment, after the glass substrate 1 is heated to approximately 220° C., DC sputtering is carried out to successively form the NiAl seed layer 2 to a thickness of 60 nm, the $Cr_{90}Mo_{10}$ underlayer 3 to a thickness of 3 nm, the CoCr intermediate layer 4 to a thickness of 1.5 nm, the CoCrPtB magnetic layer 5, and the C protection layer 6. The gas pressure was set to 5 mTorr for the formation of the layers from the NiAl seed layer 2 up to the CoCrPtB magnetic layer 5, and the gas pressure was set to 8 mTorr for the formation of the C protection layer 6. Moreover, after forming the magnetic layer 5, the annealing process was carried out at various annealing temperatures. For comparison purposes, the static magnetic characteristic was also measured for a case where no annealing process is carried out. As may be seen from FIG. 30, the annealing process contributes to the improvement of the squareness ratios S and S*, and the in-plane coercivity is also improved depending on the conditions. However, if the annealing temperature is too high, the crystal grains of the magnetic layer 5 becomes large, and as a result, various inconveniences are introduced, such as reduced in-plane coercivity and deformation of the substrate 1 due to excessive thermal hysteresis applied on the substrate 1. For these reasons, it is preferable that an upper limit of the annealing temperature is set to approximately 200° C.

Figure 31:
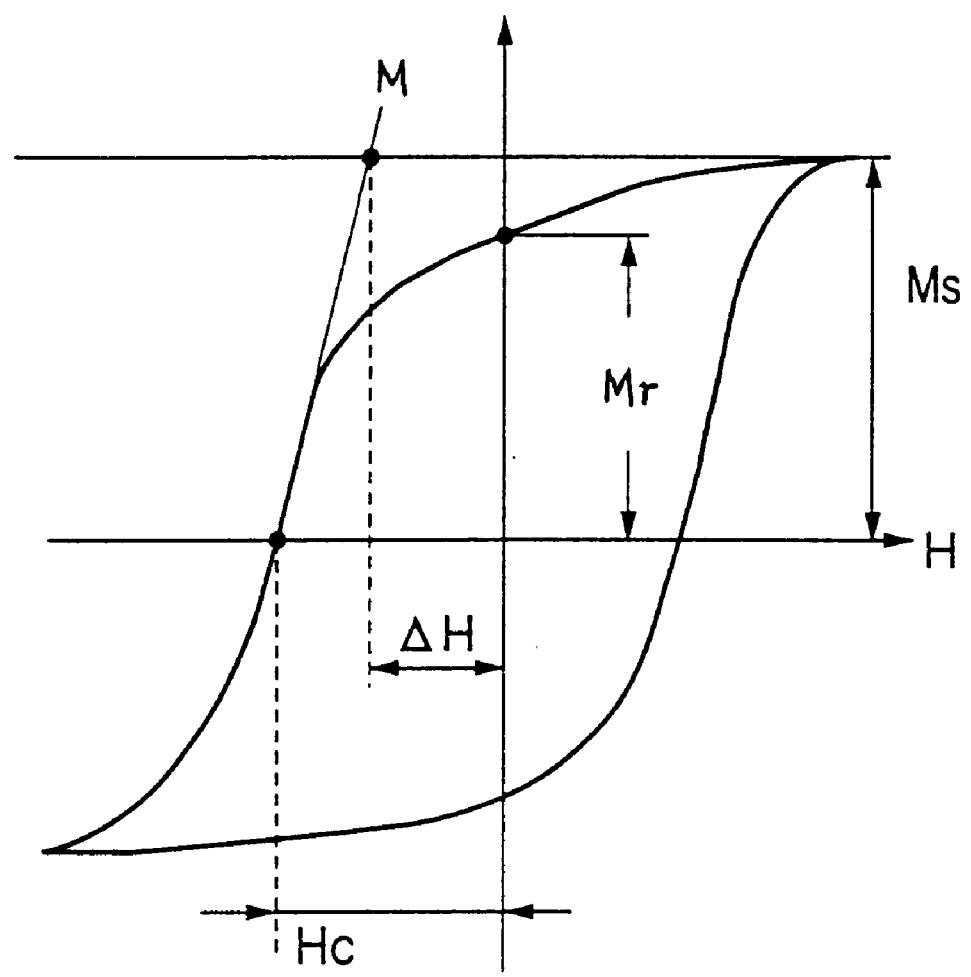
FIG. 31 is a diagram showing a M-H curve for explaining a squareness ratio.

FIG. 31 is a diagram showing a M-H curve for explaining the squareness ratio. In FIG. 31, the ordinate indicates the magnetization M, and the abscissa indicates the magnetic field H. In addition, Mr denotes the residual magnetization, Ms denotes the saturation magnetization, Hc denotes the coercivity, and ΔH indicates a magnetic field corresponding to an intersection of a tangent to the hysteresis loop in the second quadrant drawn from Hc and the value of Ms. p The squareness ratio S is described by S=Mr/Ms, and the coercivity squareness ratio S* is described by S*=ΔH/Hc. The squareness ratios S and S* both approximately correspond to the crystal orientation, and the crystal orientation becomes better as the values thereof become closer to one.

Figure 32:
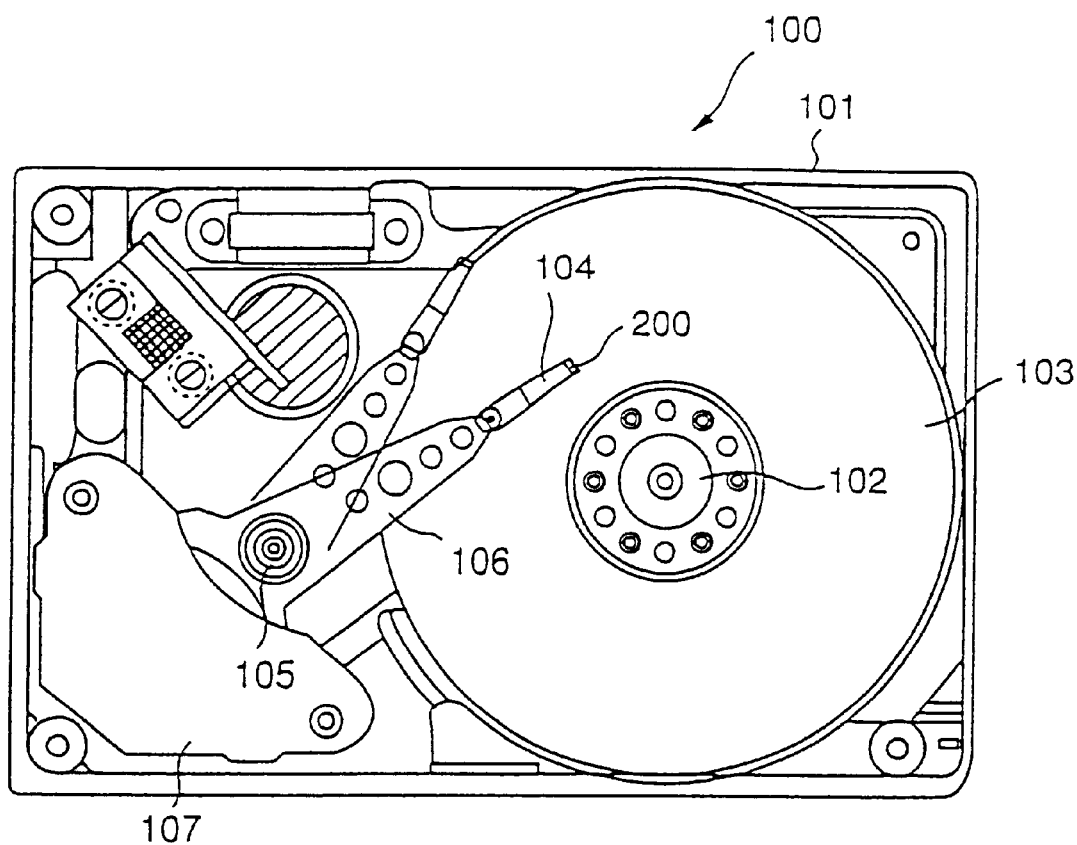
FIG. 32 is a plan view showing an embodiment of a magnetic storage apparatus according to the present invention.

FIG. 32 is a plan view showing an embodiment of a magnetic storage apparatus according to the present invention. In FIG. 32, the present invention is applied to a hard disk drive (HDD).

As shown in FIG. 32, a HDD 100 is generally made up of a housing 101. This housing 101 accommodates a rotary shaft 102, a magnetic disk 103 which is loaded on the rotary shaft 102, a floating head slider 104 which confronts the magnetic disk 103, an arm shaft 105, a carriage arm 106 which has the floating head slider 104 fixed on a tip end thereof and moves horizontally on the magnetic disk 103 about the arm shaft 103, and an actuator 107 which drives the carriage arm 106 to move horizontally. When recording information on or reproducing information from the magnetic disk 103, the carriage arm 106 is driven by the actuator 107 which is formed by a magnetic circuit, and the floating head slider 104 is positioned on a desired track of the rotating magnetic disk 103. A magnetic head 200 is provided on a tip end of the floating head slider 104. For the sake of convenience ,FIG. 32 shows the HDD 100 in a state where a cover provided on top of the housing 101 is removed.

The magnetic disk 103 has the structure of any one of the embodiments of the magnetic recording medium described above. In addition, a plurality of magnetic disks 103 may be provided. In this case, the number of magnetic heads 200 and the like of course corresponds to the number of magnetic disks 103 that are provided.

Further, the present invention is not limited to these embodiments, but various variations and modifications may be made without departing from the scope of the present invention.

What is claimed is:

1. A magnetic recording medium comprising:

a substrate;

a nonmagnetic seed layer provided on the substrate; and a magnetic layer provided on the nonmagnetic seed layer via one or a plurality of layers, said nonmagnetic seed layer being made of NiAl having an oxygen concentration of approximately 1500 to 4000 ppm, wherein oxygen randomly exists in a maldistributed manner within NiAl crystal grains of the nonmagnetic seed layer.

2. The magnetic recording medium as claimed in claim 1, wherein the nonmagnetic seed layer has a thickness in a range of approximately 40 to 80 nm.

3. The magnetic recording medium as claimed in claim 1, wherein NiAl crystal grains of the nonmagnetic seed layer have a diameter in a range of approximately 8 to 11 nm.

4. A magnetic recording medium comprising:

a substrate;

a nonmagnetic seed layer provided on the substrate; and a magnetic layer provided on the nonmagnetic seed layer via one or a plurality of layers, said nonmagnetic seed layer being made of NiAl having an oxygen concentration of approximately 1500 to 4000 ppm, wherein the nonmagnetic seed layer has a multi-layer structure which is made up of a plurality of seed layers each including oxygen and having different oxygen contents, and the oxygen content of a seed layer closer to the substrate is larger than the oxygen content of a seed layer farther away from the substrate.

5. The magnetic recording medium as claimed in claim 4, wherein adjacent seed layers of the multi-layer structure of the nonmagnetic seed layer are separated by a nonmagnetic layer.

6. The magnetic recording medium as claimed in claim 1, wherein the substrate is nonmagnetic and is made of a crystallized glass.

7. The magnetic recording medium as claimed in claim 1, wherein the magnetic layer is made of a CoCrPtB alloy.

8. The magnetic recording medium as claimed in claim 1, wherein the magnetic layer has a Cr content of approximately 18 to 24 at %.

9. The magnetic recording medium as claimed in claim 1, wherein the magnetic layer has a Pt content of approximately 8 to 12 at %.

10. The magnetic recording medium as claimed in claim 1, wherein the magnetic layer has a B content of approximately 1 to 6 at %.

11. The magnetic recording medium as claimed in claim 1, wherein the magnetic layer has a Co content of approximately 60 at %.

12. A magnetic recording medium comprising:

a substrate;

a nonmagnetic seed layer provided on the substrate; and a magnetic layer provided on the nonmagnetic seed layer via one or a plurality of layers, said nonmagnetic seed layer being made of NiAl having an oxygen concentration of approximately 1500 to 4000 ppm, wherein crystal grains of the magnetic layer have a diameter of approximately 8 to 11 nm, and a grain diameter ratio G2/G1 is approximately 0.8 to 1.4, where G1 denotes the diameter of the crystal grains of the magnetic layer and G2 denotes a diameter of the crystal grains of the nonmagnetic seed layer.

13. The magnetic recording medium as claimed in claim 1, wherein the magnetic layer has a multi-layer structure which is made up of a plurality of layers respectively made of a CoCrPtB alloy.

14. The magnetic recording medium as claimed in claim 1, further comprising:

an underlayer provided between the nonmagnetic seed layer and the magnetic layer, and the underlayer is made of a nonmagnetic Cr alloy.

15. A method of producing a magnetic recording medium having a nonmagnetic seed layer provided on a substrate, and a magnetic layer provided on the nonmagnetic seed layer via one or a plurality of layers said nonmagnetic seed layer being made of NiAl having an oxygen concentration of approximately 1500 to 4000 ppm, said method comprising the step of:

forming the nonmagnetic seed layer by growing NiAl at a temperature in a range of approximately 200° C. to 280° C., wherein oxygen randomly exists in a maldistributed manner within NiAl crystal grains of the nonmagnetic seed layer.

16. The method of producing the magnetic recording medium as claimed in claim 15, further comprising the step of:

forming the magnetic layer at a temperature in a range of approximately 160° C. to 200° C.

17. The method of producing the magnetic recording medium as claimed in claim 16, further comprising the step of:

carrying out an annealing process after formation of the magnetic layer.

18. The method of producing the magnetic recording medium as claimed in claim 17, wherein an upper limit temperature of the annealing process is approximately 200° C.

19. A magnetic recording medium comprising:

a substrate;

a single nonmagnetic seed layer provided on the substrate; and a magnetic layer disposed on the nonmagnetic seed layer, said nonmagnetic seed layer being made of NiAl having an oxygen concentration of approximately 1500 to 4000 ppm, wherein oxygen randomly exists in a maldistributed manner within NiAl crystal grains of the single nonmagnetic seed layer.

20. The magnetic recording medium as claimed in claim 19, further comprising:

an underlayer, made of a Cr alloy, provided on said single nonmagnetic seed layer; and an intermediate layer, made of a CoCr alloy, provided on said underlayer, wherein said magnetic layer is made of a Co alloy and is provided on said intermediate layer.

* * * * *